United States Patent
Yamamoto

(10) Patent No.: US 6,829,946 B2
(45) Date of Patent: Dec. 14, 2004

(54) ELECTROMAGNETIC FLOWMETER

(75) Inventor: Tomoshige Yamamoto, Tokyo (JP)

(73) Assignee: Yamatake Corporation, Tokyo (JP)

( * ) Notice: Subject to any disclaimer, the term of this patent is extended or adjusted under 35 U.S.C. 154(b) by 0 days.

(21) Appl. No.: 10/665,084

(22) Filed: Sep. 17, 2003

(65) Prior Publication Data
US 2004/0060366 A1 Apr. 1, 2004

(30) Foreign Application Priority Data
Sep. 19, 2002 (JP) .................................. 2002-272914

(51) Int. Cl.$^7$ ................................................ G01F 1/58
(52) U.S. Cl. .................................................. 73/861.12
(58) Field of Search .............................. 73/861, 861.02, 73/861.08, 861.09, 861.11, 861.12, 861.13; 702/45, 50

(56) References Cited
U.S. PATENT DOCUMENTS
6,046,587 A * 4/2000 King et al. ................. 324/306

OTHER PUBLICATIONS
"A to Z of Flow Rate Measurement for Instrumentation Engineers" edited by Japan Measuring Instruments Federation, Kogyogijutsusha, 1995, pp. 143–160.
* cited by examiner Primary Examiner—Edward Lefkowitz
Assistant Examiner—Corey D. Mack
(74) Attorney, Agent, or Firm—Blakely Sokoloff Taylor & Zafman

(57) ABSTRACT

In an electromagnetic flowmeter, a fluid to be measured flows through a measuring pipe. An electrode in the measuring pipe detects an electromotive force generated by a magnetic field applied to the fluid and flow of the fluid. A first exciting coil applies a first magnetic field having a first frequency to the fluid. A second exciting coil applies, to the fluid, a second magnetic field obtained by amplitude-modulating a carrier having the first frequency by a modulated wave having a second frequency. A power supply section supplies an exciting current to the first and second exciting coils. A signal conversion section separates the component of the first frequency from the electromotive force to obtain an amplitude, separates one of the components of sum and difference frequencies of the first and second frequencies from the electromotive force to obtain an amplitude, and obtains an amplitude ratio. A flow rate output section calculates the flow rate of the fluid on the basis of the amplitude ratio.

14 Claims, 7 Drawing Sheets

ELECTROMAGNETIC FLOWMETER

BACKGROUND OF THE INVENTION

The present invention relates to an electromagnetic flowmeter which measures the flow rate of a fluid to be measured, which flows through a measuring pipe and, more particularly, to an exciting method and signal processing method capable of realizing accurate flow rate measurement.

An electromagnetic flowmeter measures the flow rate of a conductive fluid to be measured, which flows through a measuring pipe, by converting the flow rate into an electrical signal by using electromagnetic induction. FIG. 11 shows the arrangement of a conventional electromagnetic flowmeter.

This electromagnetic flowmeter comprises a measuring pipe 11 through which a fluid to be measured flows and a pair of electrodes 12a and 12b which oppose each other in the measuring pipe 11 to be perpendicular to both the magnetic field applied to the fluid to be measured and an axis PAX of the measuring pipe 11 and also come into contact with the fluid to be measured. The electrodes 12a and 12b detect an electromotive force generated by the magnetic field and the flow of the fluid to be measured.

The electromagnetic flowmeter also comprises an exciting coil 13 which applies, to the fluid to be measured, a magnetic field perpendicular to both the measuring pipe axis PAX and an electrode axis EAX that connects the electrodes 12a and 12b, a signal conversion section 15 which detects the electromotive force between the electrodes 12a and 12b, and a flow rate output section 16 which calculates the flow rate of the fluid to be measured from the interelectrode electromotive force detected by the signal conversion section 15.

In the electromagnetic flowmeter shown in FIG. 11, a plane PLN which includes the electrodes 12a and 12b and is perpendicular to the direction of the measuring pipe axis PAX is defined as a boundary in the measuring pipe 11. At this time, symmetrical magnetic fields are applied to the fluid to be measured on both sides of the plane PLN, i.e., the boundary in the measuring pipe 11. The exciting coil 13 can be excited by a sine wave exciting method or a rectangular wave exciting method (e.g., "A to Z of Flow Rate Measurement for Instrumentation Engineers" edited by Japan Measuring Instruments Federation, Kogyogijustusha, 1995, pp. 143–160).

The sine wave exciting method that uses a sine wave as an exciting current for an exciting coil is readily affected by commercial frequency noise. However, this problem can be solved by a high-frequency exciting method which uses an exciting current having a higher frequency.

The high-frequency exciting method is resistant to 1/f noise such as electrochemical noise or spike noise. In addition, this method can improve the response (a characteristic which makes a flow rate signal quickly follow a change in flow rate).

However, the conventional sine wave exciting method is readily affected by in-phase component noise. An example of in-phase component noise is a shift of the amplitude of a magnetic field applied to a fluid to be measured.

In the conventional electromagnetic flowmeter, when the amplitude of the exciting current supplied to the exciting coil varies (shifts) due to a fluctuation in power supply voltage, and the amplitude of the magnetic field applied to the fluid to be measured shifts, the amplitude of the interelectrode electromotive force changes, resulting in a flow rate measurement error due to the influence of shift. Such in-phase component noise cannot be removed even by the high-frequency exciting method.

To the contrary, the rectangular wave exciting method that uses a rectangular wave as an exciting current to be supplied to an exciting coil is resistant to in-phase component noise.

In the rectangular wave exciting method, however, the interelectrode electromotive force is detected when a change in magnetic field becomes zero. When the exciting current has a high frequency, the detector must have high performance.

Additionally, in the rectangular wave exciting method, when the exciting current has a high frequency, effects of the impedance of the exciting coil, the exciting current response, the magnetic field response, and an overcurrent loss in the core of the exciting coil or measuring pipe cannot be neglected. It is difficult to maintain rectangular wave excitation.

As a result, in the rectangular wave exciting method, high-frequency excitation is difficult, and an increase in response to a change in flow rate or removal of 1/f noise cannot be realized.

SUMMARY OF THE INVENTION

It is an object of the present invention to provide an electromagnetic flowmeter which can remove in-phase component noise and correct any flow rate measurement error and also realize high-frequency excitation.

In order to achieve the above object, according to the present invention, there is provided an electromagnetic flowmeter comprising a measuring pipe through which a fluid to be measured flows, an electrode which is arranged in the measuring pipe and detects an electromotive force generated by a magnetic field applied to the fluid and flow of the fluid, a first exciting coil which is arranged separately from a plane, which includes the electrode and is perpendicular to a direction of an axis of the measuring pipe, and applies a first magnetic field having a first frequency to the fluid, a second exciting coil which is arranged on a side opposite to the first exciting coil with respect to the plane and applies, to the fluid, a second magnetic field obtained by amplitude-modulating a carrier having the first frequency by a modulated wave having a second frequency, a power supply section which supplies an exciting current to the first exciting coil and the second exciting coil, a signal conversion section which separates a component of the first frequency from the electromotive force detected by the electrode to obtain an amplitude, separates one of components of sum and difference frequencies of the first and second frequencies from the electromotive force to obtain an amplitude, and obtains a ratio of the amplitudes, and a flow rate output section which calculates a flow rate of the fluid on the basis of the amplitude ratio obtained by the signal conversion section.

DESCRIPTION OF THE PREFERRED EMBODIMENTS

[Basic Principle]

Before a description of the basic principle of the present invention, generally known basic mathematical knowledge will be described. A cosine wave $A \cos(\omega t)$ and sine wave $B \sin(\omega t)$, which have the same frequency and different amplitudes, are synthesized into the following cosine wave. A and B are amplitudes, and $\omega$ is an angular frequency.

$$A \cos(\omega t) + B \sin(\omega t) = (A^2 + B^2)^{1/2} \cos(\omega t - \epsilon) \text{ for } \epsilon = \tan^{-1}(B/A) \quad (1)$$

To analyze the synthesis of equation (1), it is convenient to map the cosine wave $A \cos(\omega t)$ and sine wave $B \sin(\omega t)$ onto a complex coordinate plane while plotting the amplitude A of the cosine wave $A \cos(\omega t)$ along the real axis and the amplitude B of the sine wave $B \sin(\omega t)$ along the imaginary axis.

More specifically, on the complex coordinate plane, a distance $(A^2+B^2)^{1/2}$ from the origin gives the amplitude of the synthetic wave, and an angle $\epsilon = \tan^{-1}(B/A)$ with respect to the real axis gives the phase difference between the synthetic wave and $\omega t$.

In addition, on the complex coordinate plane, the following relation holds $$C \exp(j\epsilon) = C \cos(\epsilon) + jC \sin(\epsilon) \quad (2)$$

Equation (2) is an expression of a complex vector. In equation (2), j is the imaginary number unit, C is the length of the complex vector, and $\epsilon$ is the direction of the complex vector. Hence, to analyze the geometrical relationship on the complex coordinate plane, it is convenient to use conversion to a complex vector.

In the following description, to explain a behavior that is exhibited by an interelectrode electromotive force and the manner the present invention uses the behavior, mapping to the complex coordinate plane and geometrical analysis using a complex vector are employed.

Figure 1:
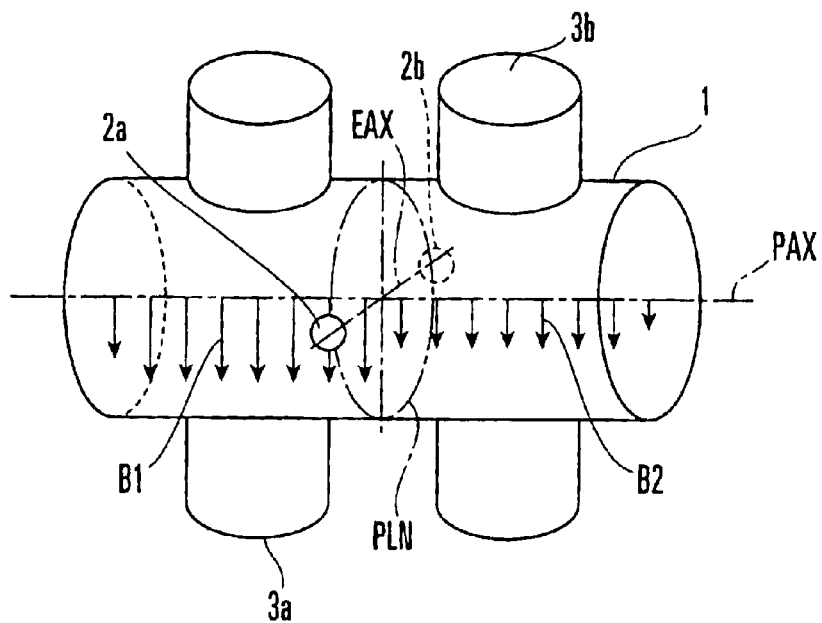
FIG. 1 is a view for explaining the basic principle of an electromagnetic flowmeter according to the present invention.

First, an interelectrode electromotive force which is irrelevant to the flow rate (flow velocity) of a fluid to be measured per unit time will be described. As shown in FIG. 1, an electromagnetic flowmeter comprises a measuring pipe 1 through which a fluid to be measured flows and a pair of electrodes 2a and 2b which oppose each other in the measuring pipe 1 to be perpendicular to both the magnetic field applied to the fluid to be measured and an axis PAX of the measuring pipe 1 and also come into contact with the fluid to be measured. The electrodes 2a and 2b detect an electromotive force generated by the magnetic field and the flow of the fluid to be measured.

The electromagnetic flowmeter also comprises a first exciting coil 3a and second exciting coil 3b. In the electromagnetic flowmeter, a plane PLN which includes the electrodes 2a and 2b and is perpendicular to the direction of the measuring pipe axis PAX is defined as a boundary in the measuring pipe 1. At this time, the first exciting coil 3a and second exciting coil 3b apply asymmetrical magnetic fields to the fluid to be measured on both sides of the plane PLN, i.e., the boundary in the measuring pipe 1.

Of the magnetic field generated from the first exciting coil 3a, a magnetic field component (magnetic flux density) B1 which is perpendicular to both an electrode axis EAX that connects the electrodes 2a and 2b and the measuring pipe axis PAX on the electrode axis EAX, and of the magnetic field generated from the second exciting coil 3b, a magnetic field component (magnetic flux density) B2 which is perpendicular to both the electrode axis EAX and the measuring pipe axis PAX on the electrode axis EAX are given by $$B1 = b1 \cos(\omega 0 t - \theta 1) \quad (3)$$

$$B2 = b2 \cos(\omega 0 t - \theta 2) \quad (4)$$

In equations (3) and (4), b1 and b2 are the amplitudes, $\omega 0$ is the angular frequency, and $\theta 1$ and $\theta 2$ are the phase differences (phase delays) from $\omega 0 t$. The magnetic flux density B1 will be referred to as the magnetic field B1, and the magnetic flux density B2 will be referred to as the magnetic field B2.

An electromotive force caused by a change in magnetic field is obtained by a time differential dB/dt of the magnetic field. The magnetic fields B1 and B2 generated from the first exciting coil 3a and second exciting coil 3b are differentiated as follows.

$$dB1/dt = -b1\omega 0 \sin(\omega 0 t - \theta 1) \quad (5)$$

$$dB2/dt = -b2\omega 0 \sin(\omega 0 t - \theta 2) \quad (6)$$

When the flow rate of the fluid to be measured is 0, eddy currents generated by the magnetic fields B1 and B2 contain only components generated by a change in magnetic fields. An eddy current Ia by the magnetic field B1 and eddy current Ib by the magnetic field B2 have directions as shown in FIG. 2.

Figure 2:
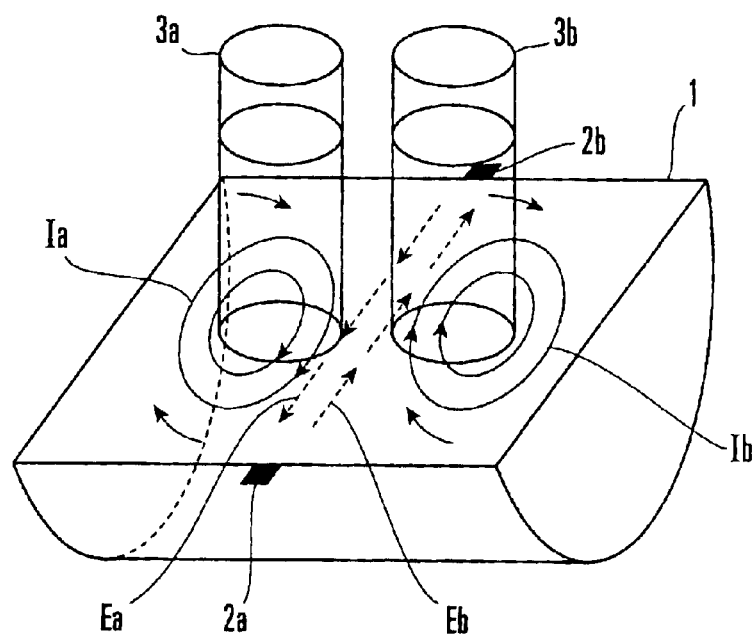
FIG. 2 is a view showing an eddy current and interelectrode electromotive force when the flow rate of a fluid to be measured is 0.

Hence, in the plane that includes the electrode axis EAX and measuring pipe axis PAX, an interelectrode electromotive force Ea that is generated by a change in magnetic field B1 and is irrelevant to the flow rate (flow velocity) and an interelectrode electromotive force Eb that is generated by a change in magnetic field B2 and is irrelevant to the flow rate (flow velocity) have opposite directions, as shown in FIG. 2.

At this time, a total interelectrode electromotive force E obtained by adding the interelectrode electromotive forces Ea and Be corresponds to a value obtained by calculating the difference between the time differentials dB1/dt and dB2/dt of the magnetic fields and multiplying the difference by a coefficient k (a complex number related to the conductivity and dielectric constant of the fluid to be measured and the structure of the measuring pipe 1).

$$E = k\{-b2\omega 0 \sin(\omega 0 t - \theta 2) + b1\omega 0 \sin(\omega 0 t - \theta 1)\} \quad (7)$$

Equation (7) can be rewritten to $$E = -kb2\omega 0 \sin(\omega 0 t)\cos(-\theta_2) - \quad (8)$$
$$kb2\omega 0 \cos(\omega 0 t)\sin(-\theta_2) +$$
$$kb1\omega 0 \sin(\omega 0 t)\cos(-\theta_1) +$$

-continued
$$kb1\omega 0\cos(\omega 0t)\sin(-\theta_1) =$$
$$\{-b2\sin(-\theta_2) +$$
$$b1\sin(-\theta_1)\}\omega 0k\cos(\omega 0t) +$$
$$\{-b2\cos(-\theta_2) +$$
$$b1\cos(-\theta_1)\}\omega 0k\sin(\omega 0t)$$

When equation (8) is mapped onto a complex coordinate plane based on $\omega 0t$, a real axis component Ex and imaginary axis component Ey are given by $$Ex = \{-b2\sin(-\theta_2) + b1\sin(-\theta_1)\}\omega 0k \quad (9)$$

$$Ey = \{-b2\cos(-\theta_2) + b1\cos(-\theta_1)\}\omega 0k \quad (10)$$

Ex and Ey in equations (9) and (10) are rewritten to $$Ex = \{-b2\sin(-\theta_2) + b1\sin(-\theta_1)\}\omega 0k \quad (11)$$
$$= \{-b2\cos(\pi/2 + \theta_2) + b1\cos(\pi/2 + \theta_1)\}\omega 0k$$
$$= \{b2\cos(-\pi/2 + \theta_2) + b1\cos(\pi/2 + \theta_1)\}\omega 0k$$

$$Ey = \{-b2\cos(-\theta_2) + b1\cos(-\theta_1)\}\omega 0k \quad (12)$$
$$= \{-b2\sin(\pi/2 + \theta_2) + b1\sin(\pi/2 + \theta_1)\}\omega 0k$$
$$= \{b2\sin(-\pi/2 + \theta_2) + b1\sin(\pi/2 + \theta_1)\}\omega 0k$$

to obtain a complex vector Ec given by $$Ec = Ex + jEy \quad (13)$$
$$= \{b2\cos(-\pi/2 + \theta_2) +$$
$$b1\cos(\pi/2 + \theta_1)\}\omega 0k +$$
$$j\{b2\sin(-\pi/2 + \theta_2) +$$
$$b1\sin(\pi/2 + \theta_1)\}\omega 0k$$
$$= \{b1\cos(\pi/2 + \theta_1) +$$
$$jb1\sin(\pi/2 + \theta_1)\}\omega 0k +$$
$$\{b2\cos(-\pi/2 + \theta_2) +$$
$$jb2\sin(-\pi/2 + \theta_2)\}\omega 0k$$
$$= b1\omega 0k\exp\{j(\pi/2 + \theta_1)\} +$$
$$b2\omega 0k\exp\{j(-\pi/2 + \theta_2)\}$$

The above-described coefficient k can be converted into a complex vector given by $$k = rk\cos(\theta_{00}) + jrk\sin(\theta_{00}) \quad (14)$$
$$= rk\exp(j\theta_{00})$$

In equation (14), rk is a proportional coefficient, and $\theta_{00}$ is the angle of the vector k with respect to the real axis. The angle $\theta_{00}$ changes in accordance with a delay of the magnetic field with respect to the exciting current or a change in conductivity of the fluid. The change in angle $\theta_{00}$ is flow rate measurement error.

When equation (14) is substituted into equation (13), the interelectrode electromotive force Ec (an interelectrode electromotive force which is caused only by a time-rate change in magnetic field and is irrelevant to the flow velocity) converted into the complex vector is given by $$Ec = b1\omega 0k\exp\{j(\pi/2 + \theta_1)\} + \quad (15)$$
$$b2\omega 0k\exp\{j(-\pi/2 + \theta_2)\}$$
$$= b1\omega 0rk\exp\{j(\pi/2 + \theta_1 + \theta_{00})\} +$$
$$b2\omega 0rk\exp\{j(-\pi/2 + \theta_2 + \theta_{00})\}$$

In equation (15), $b1\omega 0rk \exp\{j(\pi/2+\theta_1+\theta_{00})\}$ is a complex vector whose length is $b1\omega 0rk$ and angle from the real axis is $\pi/2+\theta_1+\theta_{00}$, and $b2\omega 0rk \exp\{j(-\pi/2+\theta_2+\theta_{00})\}$ is a complex vector whose length is $b2\omega 0rk$ and angle from the real axis is $-\pi/2+\theta_2+\theta_{00}$.

Figure 3:
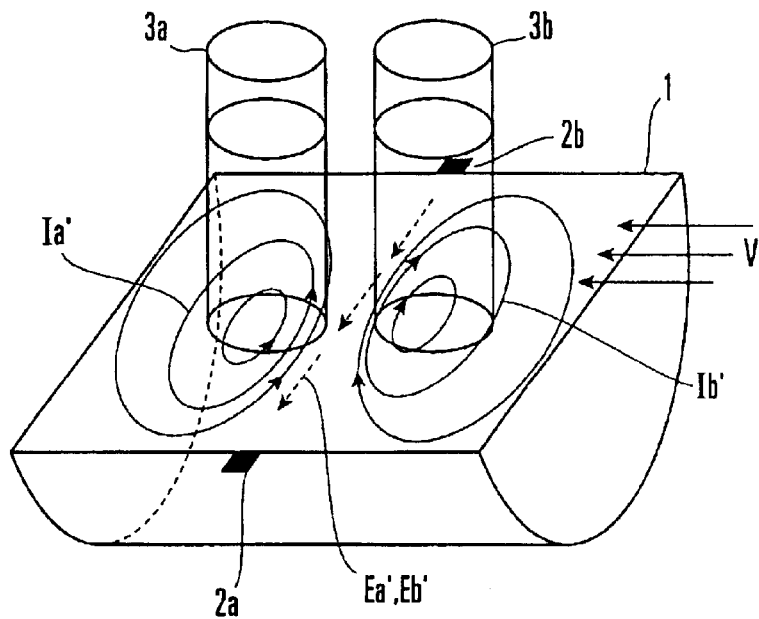
FIG. 3 is a view showing an eddy current and interelectrode electromotive force when the flow rate of a fluid to be measured is not 0.

The interelectrode electromotive force caused by the flow rate (flow velocity) of the fluid to be measured will be described next. When the flow velocity of the fluid to be measured is V (V≠0), eddy currents by the magnetic fields B1 and B2 respectively contain components V×B1 and V×B2 caused by the flow velocity in addition to the eddy current components Ia and Ib when the flow velocity is 0. For this reason, an eddy current Ia' by the magnetic field B1 and an eddy current Ib' by the magnetic field B2 have directions as shown in FIG. 3.

Hence, an interelectrode electromotive force Ea' generated by the flow velocity V of the fluid to be measured and the magnetic field B1 and an interelectrode electromotive force Eb' generated by the flow velocity V and the magnetic field B2 have the same direction.

At this time, a total interelectrode electromotive force Ev obtain by adding the interelectrode electromotive forces Ea' and Eb' generated by the flow velocity corresponds to the sum of a value obtained by multiplying the magnetic field B1 by a coefficient kv (a complex number related to the flow velocity V, the conductivity and dielectric constant of the fluid to be measured, and the structure of the measuring pipe 1) and a value obtained by multiplying the magnetic field B2 by the coefficient kv.

$$Ev = kv\{b1\cos(\omega 0t - \theta_1) + b2\cos(\omega 0t - \theta_2)\} \quad (16)$$

When the term of sin and the term of cos of equation (16) are expanded, we obtain $$Ev = kvb1\cos(\omega 0t)\cos(-\theta_1) - \quad (17)$$
$$kvb1\sin(\omega 0t)\sin(-\theta_1) +$$
$$kvb2\cos(\omega 0t)\cos(-\theta_2) -$$
$$kvb2\sin(\omega 0t)\sin(-\theta_2)$$
$$= \{b1\cos(-\theta_1) +$$
$$b2\cos(-\theta_2)\}kv\cos(\omega 0t) +$$
$$\{-b1\sin(-\theta_1) -$$
$$b2\sin(-\theta_2)\}kv\sin(\omega 0t)$$

When equation (17) is mapped onto the complex coordinate plane based on $\omega 0t$, a real axis component Evx and imaginary axis component Evy are given by $$Evx = \{b1\cos(-\theta_1) + b2\cos(-\theta_2)\}kv \quad (18)$$

$$Evy = \{-b1\sin(-\theta_1) - b2\sin(-\theta_2)\}kv \quad (19)$$

Equations (18) and (19) are transformed into a complex vector Evc.

$$Evx = \{b1\cos(-\theta_1) + b2\cos(-\theta_2)\}kv \quad (20)$$
$$= \{b1\cos(\theta_1) + b2\cos(\theta_2)\}kv$$

$$Evy = \{-b1\sin(-\theta_1) - b2\sin(-\theta_2)\}kv \quad (21)$$
$$= \{b1\sin(\theta_1) + b2\sin(\theta_2)\}kv$$

$$Evc = Evx + jEvy \quad (22)$$
$$= \{b1\cos(\theta_1) + b2\cos(\theta_2)\}kv +$$
$$j\{b1\sin(\theta_1) + b2\sin(\theta_2)\}kv$$
$$= \{b1\cos(\theta_1) + jb1\sin(\theta_1)\}kv +$$
$$\{b2\cos(\theta_2) + jb2\sin(\theta_2)\}kv$$
$$= b1kv\exp(j\theta_1) + b2kv\exp(j\theta_2)$$

The above-described coefficient kv is transformed to a complex vector.

$$kv = rkv\cos(\theta_{01}) + jrkv\sin(\theta_{01})\} \quad (23)$$
$$= rkv\exp(j\theta_{01})$$

In equation (23), rkv is a proportional coefficient, $\theta 01$ is the angle of the vector kv with respect to the real axis. In this case, rkv corresponds to a value obtained by multiplying the proportional coefficient rk (equation (14)) by the flow velocity V and a proportional coefficient $\gamma$, so $v = V\gamma$. That is, $$rkv = rkV\gamma \quad (24)$$

When equation (23) is substituted into equation (22), the interelectrode electromotive force Evc converted into complex coordinates is obtained as $$Evc = b1kv\exp(j\theta_1) + b2kv\exp(j\theta_2) \quad (25)$$
$$= b1rkv\exp\{j(\theta_1 + \theta_{01})\} +$$
$$b2rkv\exp\{j(\theta_2 + \theta_{01})\}$$

In equation (25), $b1rkv \exp\{j(\theta 1+\theta 01)\}$ is a complex vector whose length is b1rkv and angle from the real axis is $\theta 1+\theta 01$, and $b2rkv \exp\{j(\theta 2+\theta 01)\}$ is a complex vector whose length is b2rkv and angle from the real axis is $\theta 2+\theta 01$.

From equations (15) and (25), a total interelectrode electromotive force Eac obtained by adding the interelectrode electromotive force Ec generated by a time-rate change in magnetic field and the interelectrode electromotive force Evc generated by the flow velocity of the fluid is given by $$Eac = Ec + Evc \quad (26)$$
$$= b1\omega 0rk\exp\{j(\pi/2 + \theta_1 + \theta_{00})\} +$$
$$b2\omega 0rk\exp\{j(-\pi/2 + \theta_2 + \theta_{00})\} +$$
$$b1rkv\exp\{j(\theta_1 + \theta_{01})\} + b2rkv\exp\{j(\theta_2 + \theta_{01})\}$$

As is apparent from equation (26), the interelectrode electromotive force Eac is described by the four complex vectors $b1\omega 0rk \exp \{j(\pi/2+\theta 1+\theta 00)\}$, $b2\omega 0rk \exp \{j(-\pi/2+\theta 2+\theta 00)\}$, $b1rkv \exp \{j(\theta 1+\theta 01)\}$, and $b2rkv \exp \{j(\theta 2+\theta 01)\}$.

The length of a synthetic vector obtained by synthesizing the four complex vectors represents the amplitude of the output (interelectrode electromotive force Eac), and an angle $\phi$ of the synthetic vector represents the phase difference (phase delay) of the interelectrode electromotive force Eac from the phase $\omega 0t$ of the input (exciting current).

In the present invention, the carrier of an angular frequency $\omega 0$ is amplitude-, phase-, or frequency-modulated by the modulated wave of an angular frequency $\omega 2$ to obtain an exciting current. The exciting current is supplied to the first and second exciting coils 3a and 3b to apply asymmetrical magnetic fields to the fluid to be measured on both sides of the plane PLN, i.e., the boundary in the measuring pipe 1.

Accordingly, a plurality of frequency components $\omega 0$, $\omega 0+\xi\omega 2$, and $\omega 0-\xi\omega 2$ ($\xi$ is an integer ($\xi \geq 1$); for amplitude modulation, only $\xi=1$) are generated in the interelectrode electromotive force Eac. From two of these frequency components, an asymmetrical exciting characteristic parameter (amplitude ratio or phase difference) is obtained, which depends on the flow rate of the fluid and does not depend on the variation in delay ($\theta 00$) of the magnetic field with respect to the exciting current or the shift of the amplitude of the magnetic field. On the basis of the asymmetrical exciting characteristic parameter, a flow rate measurement error due to the variation in delay of the magnetic field with respect to the exciting current or the shift of the amplitude of the magnetic field is automatically corrected. This is the basic technical idea of the present invention.

Accordingly, in-phase component noise is removed so that the rectangular wave exciting method need not be used, and the sine wave exciting method can be used.

[First Embodiment]

Figure 4:
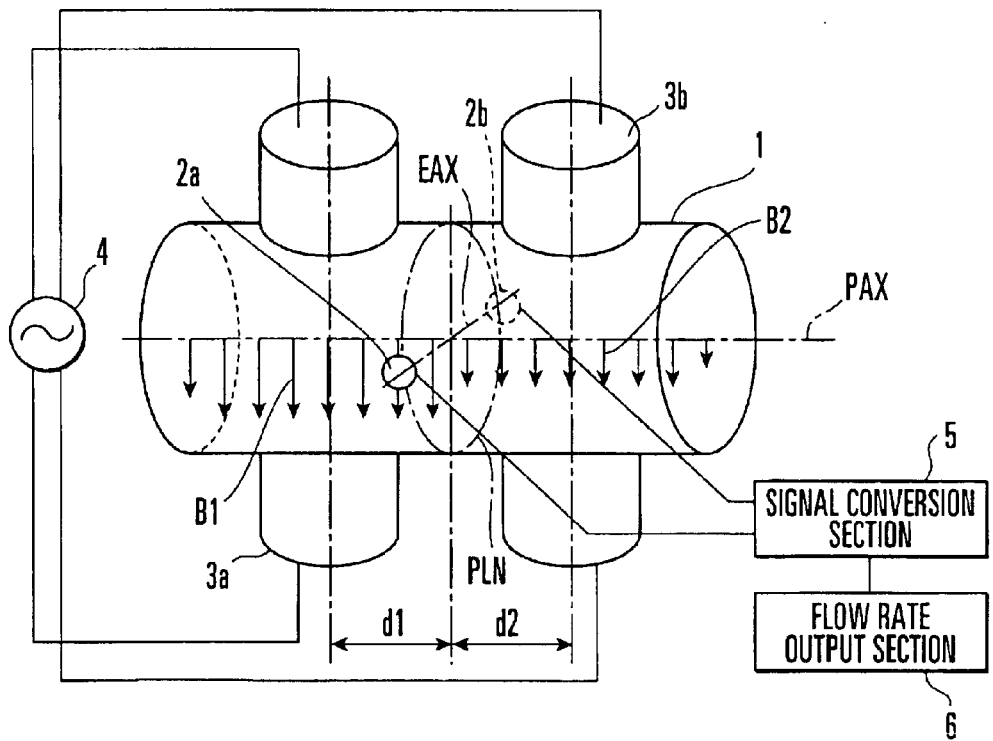
FIG. 4 is a block diagram showing the arrangement of an electromagnetic flowmeter according to the first embodiment of the present invention.

An embodiment of the present invention will be described below in detail. FIG. 4 shows the arrangement of an electromagnetic flowmeter according to the first embodiment of the present invention. The same reference numerals as in FIG. 1 denote the same components in FIG. 4.

The electromagnetic flowmeter according to this embodiment comprises a measuring pipe 1, electrodes 2a and 2b, first and second exciting coils 3a and 3b, and a power supply section 4 which supplies a first exciting current to the first exciting coil 3a and a second exciting current to the second exciting coil 3b.

The electromagnetic flowmeter also comprises a signal conversion section 5 and flow rate output section 6. The signal conversion section 5 obtains an amplitude by separating a component having an angular frequency $\omega 0$ from an electromotive force detected by the electrodes 2a and 2b, obtains an amplitude by separating a component having a sum frequency ($\omega 0+\omega 2$) or a difference frequency ($\omega 0-\omega 2$) of the angular frequency $\omega 0$ and an angular frequency $\omega 2$ from the electromotive force, and obtains the ratio of these amplitudes. The flow rate output section 6 calculates the flow rate of a fluid to be measured on the basis of the amplitude ratio obtained by the signal conversion section 5.

The first exciting coil 3a is arranged downstream of a plane PLN at a position separated from it by an offset distance d1. The second exciting coil 3b is arranged upstream of the plane PLN at a position separated from it by an offset distance d2. That is, the second exciting coil 3b is arranged on the opposite side of the first exciting coil 3a with respect to the plane PLN The power supply section 4 supplies a first sine wave exciting current having the first angular frequency $\omega 0$ to the first exciting coil 3a. In this embodiment, b1=b and $\theta 1=0$ in equation (3). Of the magnetic field generated from the first exciting coil 3a when the first exciting current is supplied from the power supply section 4, a magnetic field component B1 that is perpendicular to both an electrode axis EAX and a measuring pipe axis PAX on the electrode axis EAX is given by $$B1 = b \cos(\omega 0 t) \quad (27)$$

The power supply section 4 also supplies a second exciting current to the second exciting coil 3b. The second exciting current is obtained by amplitude-modulating a sine wave carrier having the same angular frequency ω0 as that of the carrier component of the first exciting current and a predetermined phase difference θ2 by using a modulated sine wave having the second angular frequency ω2.

Of the magnetic field generated from the second exciting coil 3b when the second exciting current is supplied from the power supply section 4, an amplitude b2 of a magnetic field component B2 that is perpendicular to both the electrode axis EAX and the measuring pipe axis PAX on the electrode axis EAX is given by $$b2 = b\{1 + m_a \cos(\omega 2t)\} \quad (28)$$

In equation (28), $m_a$ is an amplitude modulation index. From equations (4) and (28), the magnetic field B2 is given by $$B2 = b\{1 + m_a \cos(\omega 2t)\} \cos(\omega 0t - \theta 2) \quad (29)$$

In equation (26), b1=b, θ1=0, and θ01=θ00. When the magnetic fields B1 and B2 are given by equations (27) and (29), we obtain $$\begin{aligned}
Eac &= Ec + Evc \quad (30)\\
&= b\omega 0 rk \exp\{j(\pi/2 + \theta 00)\} + \\
&\quad b\{1 + m_a \cos(\omega 2t)\}\omega 0 rk\, \exp\{j(-\pi/2 + \theta 2 + \theta 00)\} + \\
&\quad brkv\exp\{j(\theta 00)\} + b\{1 + m_a \cos(\omega 2t)\}rkv\exp\{j(\theta 2 + \theta 00)\} \\
&= b\omega 0 rk \exp\{j(\pi/2 + \theta 00)\} + b\omega 0 rk \exp\{j(-\pi/2 + \theta 2 + \theta 00)\} + \\
&\quad brkv\exp\{j(\theta 00)\} + brkv\exp\{j(\theta 2 + \theta 00)\} + \\
&\quad m_a \cos(\omega 2t) b\omega 0 rk \exp\{j(-\pi/2 + \theta 2 + \theta 00)\} + \\
&\quad m_a \cos(\omega 2t) brkv\exp\{j(\theta 2 + \theta 00)\}
\end{aligned}$$

Four vectors on the right-hand side of equation (30), i.e., bω0rk exp{j(−π/2+θ00)} as the first term, bω0rk exp{j(−π/2+θ2+θ00)} as the second term, brkv exp{j(θ00)} as the third term, and brkv exp{j(θ2+θ00)} as the fourth term correspond to fundamental vectors obtained when no amplitude modulation is done.

The vector as the fifth term on the right-hand side of equation (30), i.e., $m_a$ cos(ω2t)bω0rk exp{j(−π/2+θ2+θ00)} can be rewritten to bω0rkm$_a$ cos{ω0t−(−π/2+θ2+θ00)} cos(ω2t) as time expression. This time expression can further be rewritten to $$\begin{aligned}
&b\omega 0 rk m_a \cos\{\omega 0t - (-\pi/2 + \theta 2 + \theta 00)\}\cos(\omega 2t) = \quad (31)\\
&(1/2)b\omega 0 rk m_a[\cos\{\omega 0t - (-\pi/2 + \theta 2 + \theta 00) + \omega 2t\} + \\
&\quad \cos\{\omega 0t - (-\pi/2 + \theta 2 + \theta 00) - \omega 2t\}] = \\
&(1/2)b\omega 0 rk m_a \cos\{(\omega 0 + \omega 2)t - (-\pi/2 + \theta 2 + \theta 00)\} + \\
&(1/2)b\omega 0 rk m_a \cos\{(\omega 0 + \omega 2)t - (-\pi/2 + \theta 2 + \theta 00)\}
\end{aligned}$$

As is apparent from equation (31), the fifth term on the right-hand side of equation (30) forms a vector (1/2) bω0rkm$_a$ exp{j(−π/2+θ2+θ00)} on each of a complex plane based on the angular frequency (ω0+ω2) and a complex plane based on the angular frequency (ω0−ω2).

The vector as the sixth term on the right-hand side of equation (30), i.e., $m_a$ cos(ω2t)brkv exp{j(θ2+θ00)} can be rewritten to brkvm$_a$ cos{ω0t−ω2+θ00)} cos(ω2t) as time expression. This time expression can further be rewritten to $$\begin{aligned}
&brkvm_a \cos\{\omega 0t - (\theta 2 + \theta 00)\}\cos(\omega 2t) = \quad (32)\\
&(1/2)brkvm_a[\cos\{\omega 0t - (\theta 2 + \theta 00) + \omega 2t\} + \\
&\quad \cos\{\omega 0t - (\theta 2 + \theta 00) - \omega 2t\}] = \\
&(1/2)brkvm_a \cos\{(\omega 0 + \omega 2)t - (\theta 2 + \theta 00)\} + \\
&1/2 brkvm_a \cos\{(\omega 0 - \omega 2)t - (\theta 2 + \theta 00)\}
\end{aligned}$$

As is apparent from equation (32), the sixth term on the right-hand side of equation (30) forms a vector (1/2)brkvm$_a$ exp {j(θ2+θ00)} on each of the complex plane based on the angular frequency (ω0+ω2) and the complex plane based on the angular frequency (ω0−ω2).

As is apparent from the above description, the fifth and sixth terms on the right-hand side of equation (30) form a complex vector Eam on each of the complex plane based on the angular frequency (ω0+ω2) and the complex plane based on the angular frequency (ω0−ω2). The complex vector Eam is given by $$Eam = (1/2)b\omega 0 rk m_a \exp\{j(-\pi/2 + \theta 2 + \theta 00)\} + (1/2)brkvm_a \exp\{j(\theta 2 + \theta 00)\} \quad (33)$$

In addition, the first to fourth terms on the right-hand side of equation (30) form a complex vector Eor on a complex plane based on the angular frequency ω0. The complex vector Eor is given by $$\begin{aligned}
Eor &= b\omega 0 rk \exp\{j(\pi/2 + \theta 00)\} + \quad (34)\\
&\quad b\omega 0 rk \exp\{j(-\pi/2 + \theta 2 + \theta 00)\} + \\
&\quad brkv\exp\{j(\theta 00)\} + \\
&\quad brkv\exp\{j(\theta 2 + \theta 00)\}
\end{aligned}$$

Figure 5:
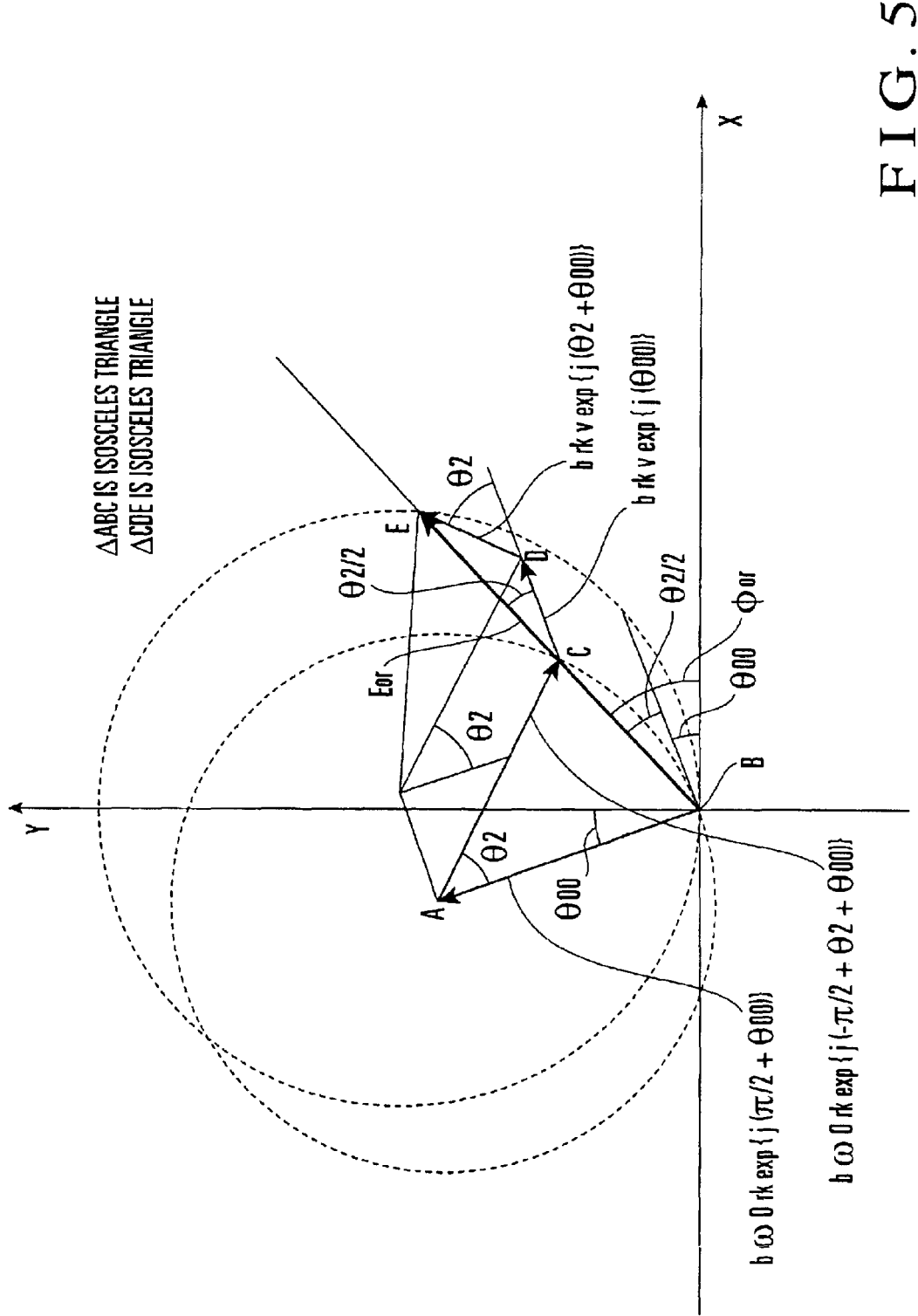
FIG. 5 is a graph showing the complex vector of the frequency component of the carrier of the interelectrode electromotive force in the first embodiment of the present invention.
Figure 6:
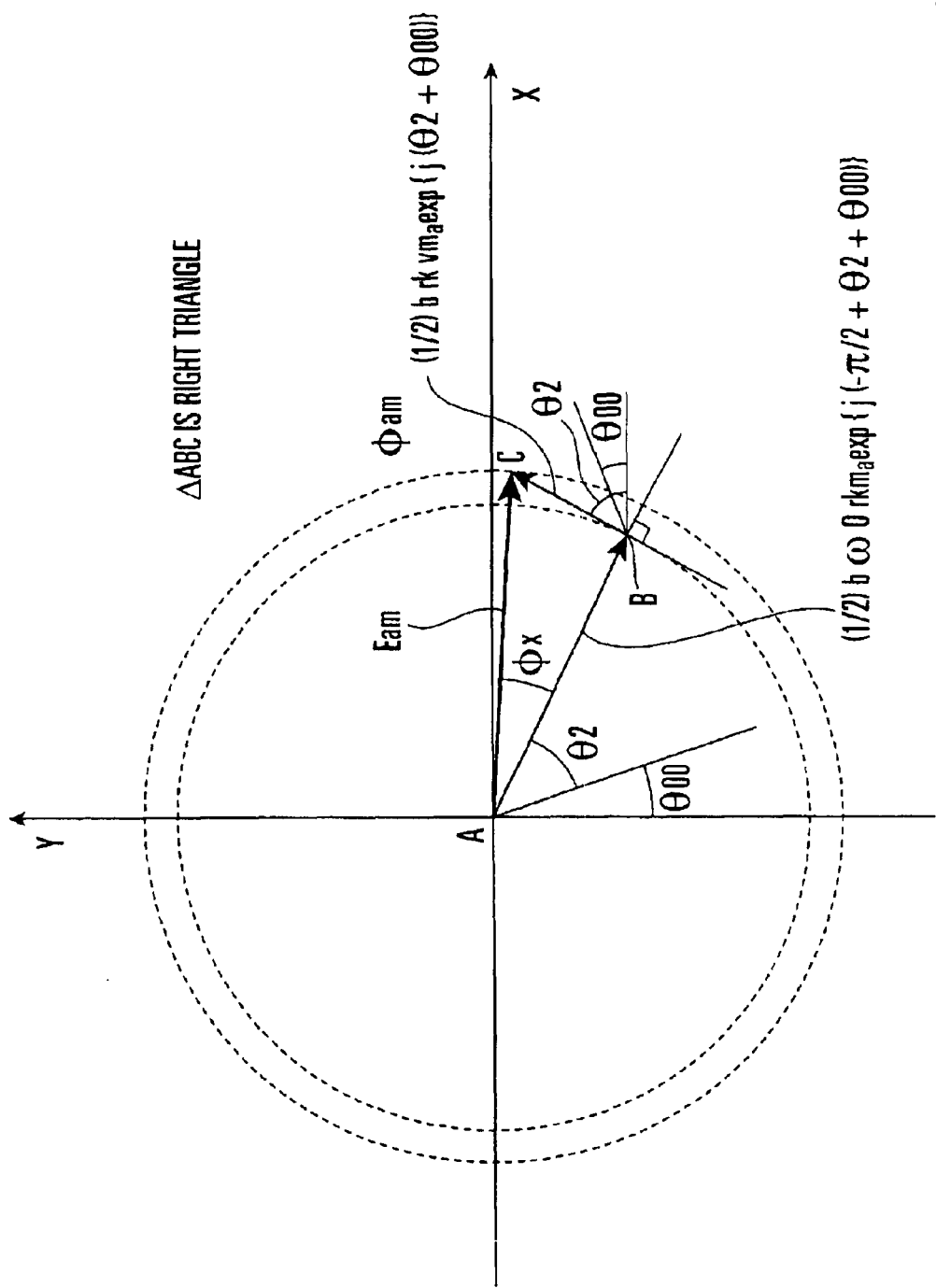
FIG. 6 is a graph showing the complex vector of the frequency component of the sideband of the interelectrode electromotive force in the first embodiment of the present invention.

FIG. 5 shows the complex vector Eor formed on the complex plane based on the angular frequency ω0 of the carrier. FIG. 6 shows the complex vector Eam formed on the complex plane based on the angular frequency (ω0+ω2) or (ω0−ω2) of the sideband.

The complex vector Eam is the synthetic vector of two complex vectors (1/2)bω0rkm$_a$ exp{j(−π/2+θ2+θ00)} and (1/2)brkvm$_a$ exp{j(θ2+θ00)}, which are perpendicular to each other. This synthetic vector only rotates about an origin A of the complex coordinate system shown in FIG. 6 as the angle θ00 changes. Hence, the synthetic vector has a predetermined magnitude independently of the change in angle θ00. The magnitude |Eam| of the complex vector Eam is given by $$\begin{aligned}
|Eam| &= [\{(1/2)b\omega 0 rk m_a\}^2 + \{(1/2)brkvm_a\}^2]^{1/2} \quad (35)\\
&= (1/2)brkm_a\{\omega 0^2 + v^2\}^{1/2}
\end{aligned}$$

The complex vector Eor is a synthetic vector of four complex vectors bω0rk exp{j(π/2+θ00)}, bω0rk exp{j(−π/2+θ2+θ00)}, brkv exp{j(θ00)}, and brkv exp{j(θ2+θ00)}, which form two isosceles triangles ΔABC and ΔCDE, as shown in FIG. 5. This synthetic vector only rotates about an origin B of the complex coordinate system shown as the angle θ00 changes. Hence, the synthetic vector has a predetermined magnitude independently of the change in angle θ00. When the bases of the isosceles triangles ΔABC and ΔCDE are synthesized, the magnitude |Eor| of the complex vector Eor is given by $$|Eor| = 2b\omega 0rk\sin(\theta 2/2) + \qquad (36)$$
$$2brkv\cos(\theta 2/2) =$$
$$2brk\{\omega 0\sin(\theta 2/2) + v\cos(\theta 2/2)\}$$

A ratio Ram of the magnitude |Eor| of the complex vector Eor to the magnitude |Eam| of the complex vector Eam is given by $$\begin{aligned}Ram &= |Eor|/|Eam| \qquad (37)\\
&= [2brk\{\omega 0\sin(\theta 2/2) + v\cos(\theta 2/2)\}]/\\
&\quad \{(1/2)brkm_a(\omega 0^2 + v^2)^{1/2}\}\\
&= [4\{\omega 0\sin(\theta 2/2) + v\cos(\theta 2/2)\}]/\{m_a(\omega 0^2 + v^2)^{1/2}\}\end{aligned}$$

The angular frequency ω0, phase difference θ2, and amplitude modulation index $m_a$ are irrelevant to the angle θ00 or the amplitude b of the magnetic field B1 (the amplitude of the carrier component of the magnetic field B2). Equation (37) that represents the ratio Ram has no term containing the angle θ00 or amplitude b.

Hence, even when the angle θ00 changes, or the amplitude b shifts, the ratio Ram does not change. When the magnitude |Eor| of the complex vector Eor and the magnitude |Eam| of the complex vector Eam are obtained, and the flow rate is detected on the basis of the ratio Ram, a flow rate measurement error due to the variation in delay of the magnetic field with respect to the exciting current or the shift of the amplitude of the magnetic field can be quickly and automatically canceled.

To obtain the flow rate of the fluid to be measured, equation (37) is rewritten to $$v=\omega 0\{-8\sin(\theta 2)+Ramm_a(16-Ram^2m_a^2)^{1/2}\}/\{8+8\cos(\theta 2)-Ram^2m_a^2\} \qquad (38)$$

From equation (24), equation (38) can be rewritten to $$V=\alpha\times\omega 0\{-8\sin(\theta 2)+Ramm_a(16-Ram^2m_a^2)^{1/2}\}/\{8+8\cos(\theta 2)-Ram^2m_a^2\} \text{ for } \alpha=1/\gamma \qquad (39)$$

where α (or γ) is a predetermined coefficient. The signal conversion section 5 detects the electromotive force Eac between the electrodes 2a and 2b and frequency-separates the detected interelectrode electromotive force Eac by a filter. Accordingly, the amplitude of the component having the angular frequency (ω0+ω2) or (ω0−ω2) (the magnitude |Eam| of the complex vector Eam) and the amplitude of the component having the angular frequency ω0 (the magnitude |Eor| of the complex vector Eor) are obtained.

The signal conversion section 5 calculates the ratio Ram of the magnitudes |Eor| to |Eam|.

The interelectrode electromotive force Eac can also be frequency-separated even by using a bandpass filter. Actually, when a comb-shaped digital filter called a comb filter is used, the interelectrode electromotive force can easily be separated into the three frequency components ω0, (ω0+ω2), and (ω0−ω2).

The flow rate output section 6 calculates a flow velocity V of the fluid to be measured, i.e., the flow rate per unit time by using equation (39) on the basis of the ratio Ram obtained by the signal conversion section 5. With the above arrangement, in this embodiment, the flow rate can be calculated while quickly and automatically canceling the flow rate measurement error so that accurate flow rate measurement can be executed.

[Second Embodiment]

The second embodiment of the present invention will be described next. The arrangement of an electromagnetic flowmeter according to this embodiment is the same as in the first embodiment and will be described with reference to FIG. 4. The operation of a power supply section 4 according to this embodiment is the same as in the first embodiment. A magnetic field B1 generated from a first exciting coil 3a when an exciting current is supplied from the power supply section 4 is given by equation (27). A magnetic field B2 generated from a second exciting coil 3b is given by equation (29). When b1=b, θb1=0, and θ01=θ00 in equation (26), an interelectrode electromotive force Eac is given by equation (30).

Four vectors that represent a component (complex vector Eor) having an angular frequency ω0 of the interelectrode electromotive force Eac have a geometrical relationship as shown in FIG. 5 described in the first embodiment. Two vectors that represent a component (complex vector Eam) having an angular frequency (ω0+ω2) or (ω0−ω2) have a geometrical relationship as shown in FIG. 6.

From FIG. 5, a phase difference ϕor between the complex vector Eor and the first exciting current supplied to the first exciting coil 3a is given by $$\phi or = \theta 2/2 + \theta 00 \qquad (40)$$

From equation (40), an angle θ00 is given by $$\theta 00 = \phi or - \theta 2/2 \qquad (41)$$

Let ϕam be the phase difference between the component having the angular frequency (ω0+ω2) of the interelectrode electromotive force Eac and the component having the angular frequency (ω0+ω2) when θ2=0 in the second exciting current supplied to the second exciting coil 3b or the phase difference between the component having the angular frequency (ω0−ω2) of the interelectrode electromotive force Eac and the component having the angular frequency (ω0−ω2) when θ2=0 in the second exciting current.

In addition, let ϕx be the angle made by a vector (1/2)bω0rkm$_a$ exp {j(−π/2+θ2+θ00)} as the first term on the right-hand side of equation (33) and a vector (1/2)brkvm$_a$ exp {j(θ2+θ00)} as the second term on the right-hand side.

At this time, a relation given by equation (42) holds between the phase difference ϕam and the angle ϕx as is apparent from FIG. 6. In the example shown in FIG. 6, however, the phase difference ham has a negative value.

$$\begin{aligned}\phi x &= \pi/2 + \phi am - \theta 00 - \theta 2 \qquad (42)\\
&= \pi/2 + \phi am - (\phi or - \theta 2/2) - \theta 2\\
&= \pi/2 + \phi am - \phi or - \theta 2/2\end{aligned}$$

In addition, ΔABC shown in FIG. 6, which is formed by the two complex vectors (1/2)bω0rkm$_a$ exp {j(−π/2+θ2+θ00)} and (1/2)brkvm$_a$ exp {j(θ2+θ00)} and their synthetic vector Eam, is a right triangle. Hence, $$\begin{aligned}\tan\phi x &= \{(1/2)brkvm_a\}/\{(1/2)b\omega 0rkm_a\} \qquad (43)\\
&= v/\omega 0\end{aligned}$$

Equation (43) can be rewritten to $$v=\omega 0\tan\phi x=\omega 0\tan\{\pi/2+\phi am-\phi or-\theta 2/2\} \qquad (44)$$

From equation (24), equation (44) can be rewritten to $$V=\alpha\times\omega 0\tan(\pi/2+\phi am-\phi or-\theta 2/2) \text{ for } \alpha=1/\gamma \qquad (45)$$

Equation (45) that represents a flow velocity V has no terms of the amplitude of the magnetic field B1 (the amplitude of the carrier component of the magnetic field B2) and angle θ00. Hence, when the flow rate is detected on the basis of the phase differences φam and φor, a flow rate measurement error due to the variation in delay of the magnetic field with respect to the exciting current or the shift of the amplitude of the magnetic field can be quickly and automatically canceled.

A signal conversion section 5 frequency-separates the interelectrode electromotive force Eac by using a filter, as in the first embodiment, to obtain the phase difference φ or between the complex vector Eor and the first exciting current supplied to the first exciting coil 3a. The signal conversion section 5 also frequency-separates the second exciting current supplied to the second exciting coil 3b by using the filter to obtain the phase difference φam between the complex vector Eam and the component having the angular frequency (ω0+ω2) or (ω0−ω2) of the second exciting current.

A flow rate output section 6 calculates the flow velocity V of the fluid to be measured by using equation (45) on the basis of the phase differences φam and φ or obtained by the signal conversion section 5. With the above arrangement, the same effect as in the first embodiment can be obtained.

Instead of using the component having the angular frequency (ω0+ω2) or (ω0−ω2) of the exciting current supplied to the second exciting coil 3b as the reference phase of the phase difference φam, the phase difference φam may be detected with reference to a timing when cos(ω2t) becomes 1.0.

[Third Embodiment]

The third embodiment of the present invention will be described next. The arrangement of an electromagnetic flowmeter according to this embodiment is the same as in the first embodiment and will be described with reference to FIG. 4. A power supply section 4 according to this embodiment supplies a first exciting current to a first exciting coil 3a. The first exciting current is obtained by amplitude-modulating a sine wave carrier having a first angular frequency ω0 by a modulated sine wave having a second angular frequency ω2. Of the magnetic field generated from the first exciting coil 3a when the first exciting current is supplied from the power supply section 4, a magnetic field component B1 which is perpendicular to both an electrode axis EAX and a measuring pipe axis PAX on the electrode axis EAX has an amplitude b1 given by $$b1 = b\{1 - m_a \cos(\omega 2t)\} \quad (46)$$

In this embodiment, θ1=0 in equation (3). From equations (3) and (46), the magnetic field component B1 is given by $$B1 = b\{1 - m_a \cos(\omega 2t)\} \cos(\omega 0 t) \quad (47)$$

The power supply section 4 also supplies a second exciting current to a second exciting coil 3b. The second exciting current is obtained by amplitude-modulating a sine wave carrier having the same angular frequency ω0 as that of the carrier component of the first exciting current and a predetermined phase difference θ2 by a modulated sine wave having the same angular frequency ω2 as that of the modulated wave component of the first exciting current and an opposite phase.

Of the magnetic field generated from the second exciting coil 3b when the second exciting current is supplied from the power supply section 4, a magnetic field component B2 which is perpendicular to both the electrode axis EAX and the measuring pipe axis PAX on the electrode axis EAX has an amplitude b2 given by $$b2 = b\{1 + m_a \cos(\omega 2t)\} \quad (48)$$

From equations (4) and (48), the magnetic field component B2 is given by $$B2 = b\{1 + m_a \cos(\omega 2t)\} \cos(\omega 0 t - \theta 2) \quad (49)$$

In equation (26), θ1=0, and θ01=θ00. When the magnetic fields B1 and B2 are given by equations (47) and (49), we obtain $$\begin{aligned}
Eac &= Ec + Evc \\
&= b\{1 - m_a\cos(\omega 2t)\}\omega 0 rk \exp\{j(\pi/2 + \theta 00)\} + \\
&\quad b\{1 + m_a\cos(\omega 2t)\}\omega 0 rk \exp\{j(-\pi/2 + \theta 2 + \theta 00)\} + \\
&\quad b\{1 - m_a\cos(\omega 2t)\}rkv \exp\{j(\theta 00)\} + \\
&\quad b\{1 + m_a\cos(\omega 2t)\}rkv \exp\{j(\theta 2 + \theta 00)\} \\
&= b\omega 0 rk \exp\{j(\pi/2 + \theta 00)\} + \\
&\quad b\omega 0 rk \exp\{j(-\pi/2 + \theta 2 + \theta 00)\} + \\
&\quad brkv \exp\{j(\theta 00)\} + \\
&\quad brkv \exp\{j(\theta 2 + \theta 00)\} - \\
&\quad m_a\cos(\omega 2t) b\omega 0 rk \exp\{j(\pi/2 + \theta 00)\} - \\
&\quad m_a\cos(\omega 2t) brkv \exp\{j(\theta 00)\} + \\
&\quad m_a\cos(\omega 2t) b\omega 0 rk \exp\{j(-\pi/2 + \theta 2 + \theta 00)\} + \\
&\quad m_a\cos(\omega 2t) brkv \exp\{j(\theta 2 + \theta 00)\} \\
&= b\omega 0 rk \exp\{j(\pi/2 + \theta 00)\} + \\
&\quad b\omega 0 rk \exp\{j(-\pi/2 + \theta 2 + \theta 00)\} + \\
&\quad brkv \exp\{j(\theta 00)\} + \\
&\quad brkv \exp\{j(\theta 2 + \theta 00)\} + \\
&\quad m_a\cos(\omega 2t) b\omega 0 rk \exp\{j(-\pi/2 + \theta 00)\} + \\
&\quad m_a\cos(\omega 2t) brkv \exp\{j(\pi + \theta 00)\} + \\
&\quad m_a\cos(\omega 2t) b\omega 0 rk \exp\{j(-\pi/2 + \theta 2 + \theta 00)\} + \\
&\quad m_a\cos(\omega 2t) brkv \exp\{j(\theta 2 + \theta 00)\}
\end{aligned} \quad (50)$$

Four vectors on the right-hand side of equation (50), i.e., bω0rk exp {j(π/2+θ00)} as the first term, bω0rk exp {j(−π/2+θ2+θ00)} as the second term, brkv exp {j(θ00)} as the third term, and brkv exp {j(θ2+θ00)} as the fourth term correspond to fundamental vectors obtained when no amplitude modulation is done.

The vector as the fifth term on the right-hand side of equation (50), i.e., $m_a$ cos(ω2t)bω0rk exp {j(−π/2+θ00)} can be rewritten to bω0rkm$_a$ cos {ω0t−(−π/2+θ00)} cos (ω2t) as time expression. This time expression can further be rewritten to $$\begin{aligned}
&b\omega 0 rk m_a \cos\{\omega 0 t - (-\pi/2 + \theta 00)\}\cos(\omega 2t) \\
&= (1/2)b\omega 0 rk m_a [\cos\{\omega 0 t - (-\pi/2 + \theta 00) + \omega 2t\} + \cos\{\omega 0 t - (-\pi/2 + \theta 00) - \omega 2t\}] \\
&= (1/2)b\omega 0 rk m_a \cos\{(\omega 0 + \omega 2)t - (-\pi/2 + \theta 00)\} + \\
&\quad (1/2)b\omega 0 rk m_a \cos\{(\omega 0 + \omega 2)t - (-\pi/2 + \theta 00)\}
\end{aligned} \quad (51)$$

As is apparent from equation (51), the fifth term on the right-hand side of equation (50) forms a vector (1/2) bω0rkm$_a$ exp {j(−π/2+θ00)} on each of a complex plane based on an angular frequency (ω0+ω2) and a complex plane based on an angular frequency (ω0−ω2).

The vector as the sixth term on the right-hand side of equation (50), i.e., $m_a \cos(\omega 2t) brkv \exp\{j(\pi+\theta 00)\}$ can be rewritten to $brkvm_a \cos\{(\omega 0t-(\pi+\theta 00)\} \cos(\omega 2t)$ as time expression. This time expression can further be rewritten to $$brkvm_a\cos\{\omega 0t - (\pi + \theta 00)\}\cos(\omega 2t) \qquad (52)$$
$$= (1/2)brkvm_a[\cos\{\omega 0t - (\pi) + \theta 00) + \omega 2t\} +$$
$$\cos\{\omega 0t - (\pi + \theta 00) - \omega 2t\}]$$
$$= (1/2)brkvm_a\cos\{(\omega 0 + \omega 2)t - (\pi + \theta 00)\} +$$
$$(1/2)brkvm_a\cos\{(\omega 0 + \omega 2)t - (\pi + \theta 00)\}$$

As is apparent from equation (52), the sixth term on the right-hand side of equation (50) forms a vector $(1/2)brkvm_a \exp\{j(\pi+\theta 00)\}$ on each of the complex plane based on the angular frequency ($\omega 0+\omega 2$) and the complex plane based on the angular frequency ($\omega 0-\omega 2$).

The seventh term on the right-hand side of equation (50), i.e., $m_a \cos(\omega 2t)b\omega 0rk \exp\{j(-\pi/2+\theta 2+\theta 00)\}$ is the same as the fifth term on the right-hand side of equation (30). Hence, the seventh term on the right-hand side of equation (50) forms a vector $(1/2)b\omega 0rkm_a \exp\{j(-\pi/2+\theta 2+\theta 00)\}$ on each of the complex plane based on the angular frequency ($\omega 0+\omega 2$) and the complex plane based on the angular frequency ($\omega 0-\omega 2$).

The eighth term on the right-hand side of equation (50), i.e., $m_a \cos(\omega 2t)brkv \exp\{j(\theta 2+\theta 00)\}$ is the same as the sixth term on the right-hand side of equation (30). Hence, the eighth term on the right-hand side of equation (50) forms a vector $(1/2)brkvm_a \exp\{j(\theta 2+\theta 00)\}$ on each of the complex plane based on the angular frequency ($\omega 0+\omega 2$) and the complex plane based on the angular frequency ($\omega 0-\omega 2$).

As is apparent from the above description, the fifth, sixth, seventh, and eighth terms on the right-hand side of equation (50) form a complex vector Eam on each of the complex plane based on the angular frequency ($\omega 0+\omega 2$) and the complex plane based on the angular frequency ($\omega 0-\omega 2$). The complex vector Eam is given by $$Eam = (1/2)b\omega 0rkm_a\exp\{j(-\pi/2 + \theta 00)\} + \qquad (53)$$
$$(1/2)b\omega 0rkm_a\exp\{j(-\pi/2 + \theta 2 + \theta 00)\} +$$
$$(1/2)brkvm_a\exp\{j(\pi + \theta 00)\} +$$
$$(1/2)brkvm_a\exp\{j(\theta_2 + \theta 00)\}$$

In addition, the first to fourth terms on the right-hand side of equation (50) form a complex vector Eor given by equation (34) on a complex plane based on the angular frequency $\omega 0$. Four vectors that represent the complex vector Eor have a geometrical relationship as shown in FIG. 5 described in the first embodiment.

Figure 7:
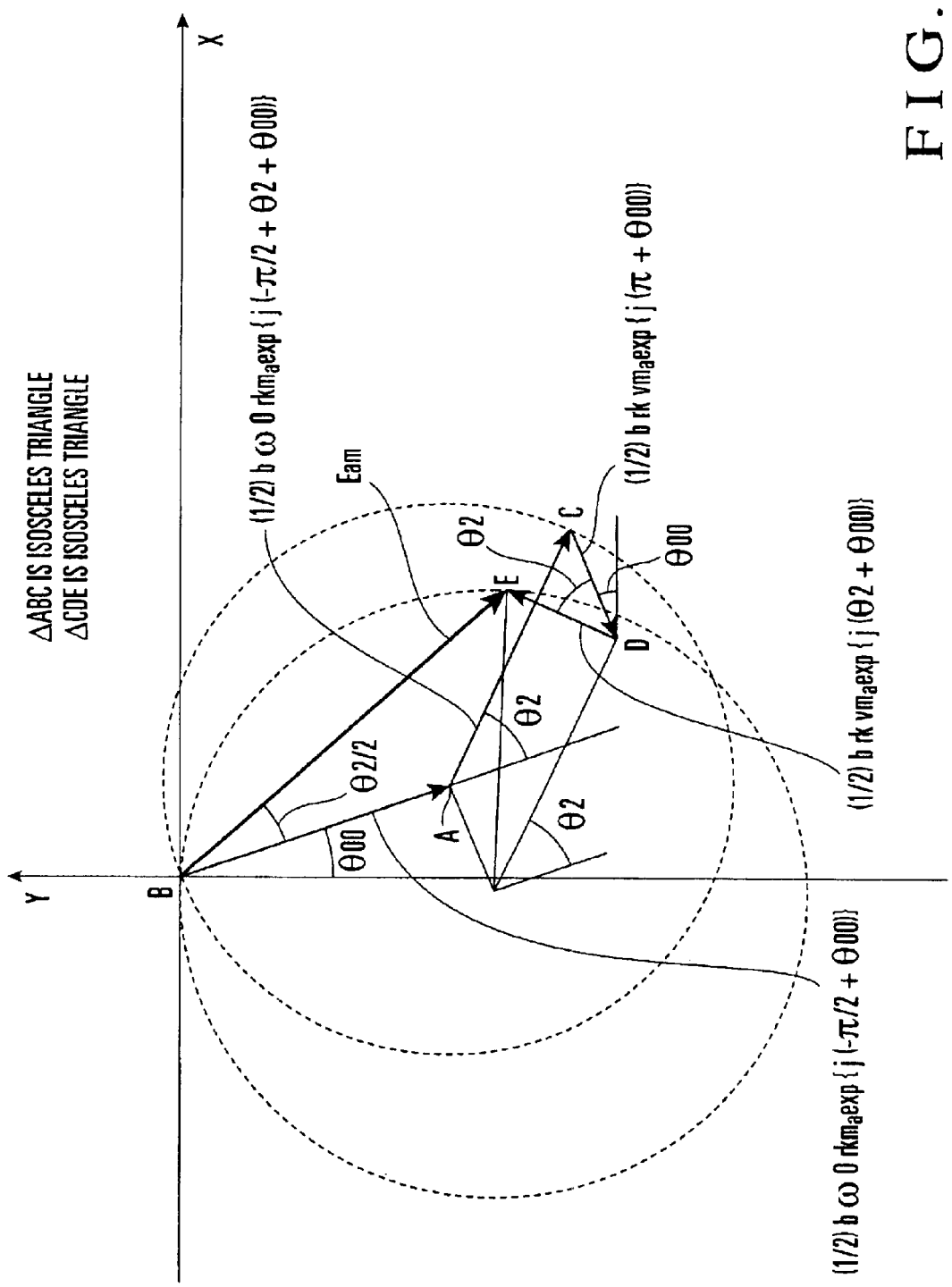
FIG. 7 is a graph showing the complex vector of the frequency component of the sideband of an interelectrode electromotive force in the third embodiment of the present invention.

Four vectors that represent the complex vector Eam, i.e., $(1/2)b\omega 0rkm_a \exp\{j(-\pi/2+\theta 00)\}$, $(1/2)b\omega 0rkm_a \exp\{j(-\pi/2+\theta 2+\theta 00)\}$, $(1/2)brkvm_a \exp\{j(\pi+\theta 00)\}$, and $(1/2)brkvm_a \exp\{j(\theta 2+\theta 00)\}$ have a geometrical relationship as shown in FIG. 7.

As shown in FIG. 7, the complex vector Eam is the synthetic vector of four vector $(1/2)b\omega 0rkm_a \exp\{j(-\pi/2+\theta 00)\}$, $(1/2)b\omega 0rkm_a \exp\{j(-\pi/2+\theta 2+\theta 00)\}$, $(1/2)brkvm_a \exp\{j(\pi+\theta 00)\}$, and $(1/2)brkvm_a \exp\{j(\theta 2+\theta 00)\}$, which form two isosceles triangles $\triangle ABC$ and $\triangle CDE$ as shown in FIG. 7. This synthetic vector only rotates about an origin B of the complex coordinate system as the angle $\theta 00$ changes. Hence, the synthetic vector has a predetermined magnitude independently of the change in angle $\theta 00$. When the bases of the isosceles triangles $\triangle ABC$ and $\triangle CDE$ are synthesized, the magnitude |Eam| of the complex vector Eam is given by $$|Eam| = 2(1/2)b\omega 0rkm_a\cos(\theta 2/2) - 2(1/2)brkvm_a\sin(\theta 2/2) \qquad (54)$$
$$= brkm_a\{\omega 0\cos(\theta 2/2) + v\sin(\theta 2/2)\}$$

The magnitude |Eor| of the complex vector Eor is given by equation (36). A ratio Ram of the magnitude |Eor| of the complex vector Eor to the magnitude |Eam| of the complex vector Eam, which is given by equation (54), is given by $$Ram = |Eor|/|Eam| \qquad (55)$$
$$= [2brk\{\omega 0\sin(\theta 2/2) + v\cos(\theta 2/2)\}]/$$
$$[brkm_a\{\omega 0\cos(\theta 2/2) - v\sin(\theta 2/2)\}]$$
$$= [2\{\omega 0\sin(\theta 2/2) + v\cos(\theta 2/2)\}]/$$
$$[m_a\{\omega 0\cos(\theta 2/2) - v\sin(\theta 2/2)\}]$$

As in the first embodiment, equation (55) that represents the ratio Ram has no term containing the angle $\theta 00$ or amplitude b. Hence, even when the angle $\theta 00$ changes, or the amplitude b shifts, the ratio Ram does not change. When the flow rate is detected on the basis of the ratio Ram, a flow rate measurement error due to the variation in delay of the magnetic field with respect to the exciting current or the shift of the amplitude of the magnetic field can be quickly and automatically canceled.

To obtain the flow rate of the fluid to be measured, equation (55) is rewritten to $$v=\omega 0\{Ramm_a \cos(\theta 2/2)-2 \sin(\theta 2/2)\}/\{Ramm_a \sin(\theta 2/2)+2 \cos(\theta 2/2)\} \qquad (56)$$

From equation (24), equation (56) can be rewritten to $$V=\alpha\times\omega 0\{Ramm_a \cos(\theta 2/2)-2 \sin(\theta 2/2)\}/\{Ramm_a \sin(\theta 2/2)+2 \cos(\theta 2/2)\} \text{ for } \alpha=1/\gamma \qquad (57)$$

A signal conversion section 5 frequency-separates the interelectrode electromotive force Eac by using a filter, as in the first embodiment, to obtain the amplitude of the component having the angular frequency ($\omega 0+\omega 2$) or ($\omega 0-\omega 2$) (the magnitude |Eam| of the complex vector Eam). The signal conversion section 5 also obtains the amplitude of the component having the angular frequency $\omega 0$ (the magnitude |Eor| of the complex vector Eor). The signal conversion section 5 calculates the ratio Ram of the magnitudes |Eor| to |Eam|.

A flow rate output section 6 calculates a flow velocity V of the fluid to be measured by using equation (57) on the basis of the ratio Ram obtained by the signal conversion section 5. With the above arrangement, the same effect as in the first embodiment can be obtained.

[Fourth Embodiment]

The fourth embodiment of the present invention will be described next. The arrangement of an electromagnetic flowmeter according to this embodiment is the same as in the first embodiment and will be described with reference to FIG. 4. A power supply section 4 according to this embodiment supplies a first sine wave exciting current having a first angular frequency $\omega 0$ to a first exciting coil 3a. In this embodiment, b1=b, and $\theta 1$=0 in equation (3). Of the magnetic field generated from the first exciting coil 3a when the first exciting current is supplied from the power supply section 4, a magnetic field component B1 which is perpendicular to both an electrode axis EAX and a measuring pipe axis PAX on the electrode axis EAX is given by equation (27).

The power supply section 4 also supplies a second exciting current to a second exciting coil 3b. The second exciting current is obtained by phase-modulating a sine wave carrier having the same angular frequency $\omega 0$ as that of the first exciting current and a predetermined phase difference $\theta 2$ by a modulated sine wave having a second angular frequency $\omega 2$. With this phase modulation, the phase of the second exciting current is given by $\omega 0t-\{\theta 2+m_p \cos(\omega 2t)\}$ where $m_p$ is a phase modulation index which represents the phase deviation amount at the maximum amplitude of the modulated wave.

In this embodiment, b2=b in equation (4). Of the magnetic field generated from the second exciting coil 3b when the second exciting current is supplied from the power supply section 4, a magnetic field component B2 which is perpendicular to both the electrode axis EAX and the measuring pipe axis PAX on the electrode axis EAX is given by $$B2 = b \cos[\omega 0t - \{\theta 2 + m_p \cos(\omega 2t)\}] \qquad (58)$$

In equation (26), b1=b2=b, $\theta 1=0$, and $\theta 01=\theta 00$. When the magnetic fields B1 and B2 are given by equations (27) and (58), we obtain $$Eac = Ec + Evc \qquad (59)$$
$$= b\omega 0rk \exp\{j(\pi/2 + \theta 00)\} +$$
$$b\omega 0rk \exp[j(-\pi/2 + m_p\cos(\omega 2t) + \theta 2 + \theta 00)] +$$
$$brkv \exp\{j(\theta 00)\} +$$
$$brkv \exp[j\{m_p\cos(\omega 2t) + \theta 2 + \theta 00\}]$$

The vector as the second term on the right-hand side of equation (59), i.e., $b\omega 0rk \exp[j\{-\pi/2+m_p \cos(\omega 2t)+\theta 2+\theta 00\}]$ can be rewritten to $b\omega 0rk \cos\{\omega 0t-m_p \cos(\omega 2t)-(-\pi/2+\theta 2+\theta 00)\}$ as time expression. This time expression can also be rewritten to $$b\omega 0rk\cos\{\omega 0t - m_p\cos(\omega 2t) - (-\pi/2+\theta 2+\theta 00)\} \qquad (60)$$
$$= b\omega 0rk[\cos\{\omega 0t - (-\pi/2+\theta 2+\theta 00)\}\cos\{m_p\cos(\omega 2t)\} + \sin\{\omega 0t - (-\pi/2+\theta 2+\theta 00)\}\sin\{m_p\cos(\omega 2t)\}]$$

In equation (60), $\cos\{m_p \cos(\omega 2t)\}$ and $\sin\{m_p \cos(\omega 2t)\}$ can be rewritten to $$\cos\{m_p\cos(\omega 2t)\} = J_0(m_p) + 2\sum_{n=2,4,\ldots}^{\infty}(-1)^{n/2}J_n(m_p)\cos(n\omega 2t) \qquad (61)$$

$$\sin\{m_p\cos(\omega 2t)\} = 2\sum_{n=1,3,\ldots}^{\infty}(-1)^{(n-1)/2}J_n(m_p)\cos(n\omega 2t) \qquad (62)$$

In equations (61) and (62), $j_n(m_p)$ (n=0, 1, 2, ...) is known as a Bessel function of fractional order. The Bessel function of fractional order, $j_n(m_p)$ is given by $$J_n(m_p) = \sum_{k=0}^{\infty}\frac{(-1)^k}{k!(n+k)!}\left(\frac{m_p}{2}\right)^{n+2k} \qquad (63)$$

In equation (63), k! indicates the factorial of k. When only a case wherein n=0 or 1 is applied to equations (61) and (62), equation (60) can be rewritten to $$b\omega 0rk\cos\{\omega 0t - m_p\cos(\omega 2t) - (-\pi/2+\theta 2+\theta 00)\} \qquad (64)$$
$$= b\omega 0rk[\cos\{\omega 0t - (-\pi/2+\theta 2+\theta 00)\}J_0(m_p) + \sin\{\omega 0t - (-\pi/2+\theta 2+\theta 00)\}2J_1(m_p)\cos(\omega 2t)]$$
$$= b\omega 0rk[J_0(m_p)\cos\{\omega 0t - (-\pi/2+\theta 2+\theta 00)\} + J_1(m_p)\sin\{(\omega 0+\omega 2)t - (-\pi/2+\theta 2+\theta 00)\} + J_1(m_p)\sin\{(\omega 0-\omega 2)t - (-\pi/2+\theta 2+\theta 00)\}]$$
$$= b\omega 0rkJ_0(m_p)\cos\{\omega 0t - (-\pi/2+\theta 2+\theta 00)\} + b\omega 0rkJ_1(m_p)\cos\{(\omega 0+\omega 2)t - (\theta 2+\theta 00)\} + b\omega 0rkJ_1(m_p)\cos\{(\omega 0-\omega 2)t - (\theta 2+\theta 00)\}$$

As is apparent from equation (64), the second term on the right-hand side of equation (59) forms a vector $b\omega 0rkJ_0(m_p)$ exp $\{j(-\pi/2+\theta 2+\theta 00)\}$ on a complex plane based on the angular frequency $\omega 0$. The second term also forms a vector $b\omega 0rkJ_1(m_p)\exp\{j(\theta 2+\theta 00)\}$ on each of a complex plane based on the angular frequency $(\omega 0+\omega 2)$ and a complex plane based on the angular frequency $(\omega 0-\omega 2)$.

The vector as the fourth term on the right-hand side of equation (59), i.e., brkv exp $[j\{m_p \cos(\omega 2t)+\theta 2+\theta 00\}]$ can be rewritten to brkv cos $\{\omega 0t-m_p \cos(\omega 2t)-(\theta 2+\theta 00)\}$ as time expression. This time expression can also be rewritten to $$brkv\cos\{\omega 0t - m_p\cos(\omega 2t) - (\theta 2+\theta 00)\} = \qquad (65)$$
$$brkv[\cos\{\omega 0t - (\theta 2+\theta 00)\}\cos\{m_p\cos(\omega 2t)\} + \sin\{\omega 0t - (\theta 2+\theta 00)\}\sin\{m_p\cos(\omega 2t)\}]$$

Like the second term on the right-hand side of equation (59), when the Bessel function of fractional order $J_n(m_p)$ is applied, equation (65) can be rewritten to $$brkv\cos\{\omega 0t - m_p\cos(\omega 2t) - (\theta 2-\theta 00)\} = \qquad (66)$$
$$brkv[\cos\{\omega 0t - (\theta 2+\theta 00)\}J_0m_p + \sin\{\omega 0t - (\theta 2+\theta 00)\}2J_1(m_p)\cos(\omega 2t)] =$$
$$brkv[J_0(m_p)\cos\{\omega 0t - (\theta 2+\theta 00)\} + J_1(m_p)\cos\{(\omega 0+\omega 2)t - (\pi/2+\theta 2+\theta 00)\} + J_1(m_p)\cos\{(\omega 0-\omega 2)t - (\pi/2+\theta 2+\theta 00)\}]$$

As is apparent from equation (66), the fourth term on the right-hand side of equation (59) forms a vector $brkvJ_0(m_p)$ exp $\{j(\theta 2+\theta 00)\}$ on the complex plane based on the angular frequency $\omega 0$. The fourth term also forms a vector $brkvJ_1(m_p)\exp\{j(\pi/2+\theta 2+\theta 00)\}$ on each of the complex plane based on the angular frequency $(\omega 0+\omega 2)$ and the complex plane based on the angular frequency $(\omega 0-\omega 2)$.

As is apparent from the above description, the second and fourth terms on the right-hand side of equation (59) form a complex vector Epm on each of the complex plane based on the angular frequency ($\omega 0+\omega 2$) and the complex plane based on the angular frequency ($\omega 0-\omega 2$). The complex vector Epm is given by $$Epm = b\omega 0 rk J_1(m_p)\exp\{j(\theta 2+\theta 00)\} + brkv J_1(m_p)\exp\{j(\pi/2+\theta 2+\theta 00)\} \quad (67)$$

In addition, the first to fourth terms on the right-hand side of equation (59) form a complex vector Eor on the complex plane based on the angular frequency $\omega 0$. The complex vector Eor is given by $$Eor = b\omega 0 rk \exp\{j(\pi/2 + \theta 00)\} +$$
$$brkv \exp\{j(\theta 00)\} +$$
$$b\omega 0 rk J_0(m_p)\exp\{j(-\pi/2 + \theta 2 + \theta 00)\} +$$
$$brkv J_0(m_p)\exp\{j(\theta 2 + \theta 00)\} \quad (68)$$

The magnitude $|Epm|$ of the complex vector Epm given by equation (67) is given by $$|Epm| = brk\{J_1(m_p)^2\{\omega 0^2 + v^2\}\}^{1/2} \quad (69)$$

The magnitude $|Eor|$ of the complex vector Eorm given by equation (68) is given by $$|Eor| = brk[\{v + J_0(m_p)\sin(\theta 2)\omega 0 +$$
$$J_0(m_p)\cos(\theta 2)v\}^2 +$$
$$\{\omega 0 - J_0(m_p)\cos(\theta 2)\omega 0 +$$
$$J_0(m_p)\sin(\theta 2)v\}^2]^{1/2} \quad (70)$$

A ratio Rpm of the magnitude $|Eor|$ of the complex vector Eor to the magnitude $|Epm|$ of the complex vector Epm is given by $$Rpm = |Eor|/|Epm| \quad (71)$$

The magnitude $|Epm|$ given by equation (69) and the magnitude $|Eor|$ given by equation (70) have no term containing the angle $\theta 00$. The magnitudes $|Eor|$ and $|Epm|$ contain brk. However, when the ratio Rpm is obtained by equation (71), brk is erased from the ratio Rpm.

Hence, even when the angle $\theta 00$ changes, or the amplitude (the amplitude of the carrier component of the magnetic field B2) b of the magnetic field B1 shifts, the ratio Rpm does not change. When the flow rate is detected on the basis of the ratio Rpm, a flow rate measurement error due to the variation in delay of the magnetic field with respect to the exciting current or the shift of the amplitude of the magnetic field can be quickly and automatically canceled. When equations (69) and (70) are substituted into equation (71), and equation (71) is solved about v, we obtain $$v = [\omega 0\{-2J_0(m_p)\sin(\theta 2) + \quad (72)$$
$$\{2J_0(m_p)^2 - J_0(m_p)^4 + 2J_0(m_p)^2 J_1(m_p)^2 Rpm^2 - 1 +$$
$$2J_1(m_p)^2 Rpm^2 - J_1(m_p)^4 Rpm^4\}^{1/2}\}]/$$
$$\{J_0(m_p)^2 + 1 + 2J_0(m_p)\cos(\theta 2) - J_1(m_p)^2 Rpm^2\}$$

From equation (24), equation (72) can be rewritten to $$V = \alpha \times [\omega 0\{-2J_0(m_p)\sin(\theta 2) + \{2J_0(m_p)^2 - J_0(m_p)^4 + \quad (73)$$

-continued
$$2J_0(m_p)^2 J_1(m_p)^2 Rpm^2 - 1 + 2J_1(m_p)^2 Rpm^2 -$$
$$J_1(m_p)^4 Rpm^4\}^{1/2}\}]/\{J_0(m_p)^2 + 1 + 2J_0(m_p)\cos(\theta 2) -$$
$$J_1(m_p)^2 Rpm^2\} \text{ for } \alpha = 1/\gamma$$

A signal conversion section 5 frequency-separates an interelectrode electromotive force Eac by using a filter, as in the first embodiment, to obtain the amplitude of the component having the angular frequency ($\omega 0+\omega 2$) or ($\omega 0-\omega 2$) (the magnitude $|Epm|$ of the complex vector Epm). The signal conversion section 5 also obtains the amplitude of the component having the angular frequency $\omega 0$ (the magnitude $|Eor|$ of the complex vector Eor). The signal conversion section 5 calculates the ratio Rpm of the magnitudes $|Eor|$ to $|Epm|$.

A flow rate output section 6 calculates a flow velocity V of the fluid to be measured by using equation (73) on the basis of the ratio Rpm obtained by the signal conversion section 5. With the above arrangement, the same effect as in the first embodiment can be obtained.

[Fifth Embodiment]

The fifth embodiment of the present invention will be described next. The arrangement of an electromagnetic flowmeter according to this embodiment is the same as in the first embodiment and will be described with reference to FIG. 4. A power supply section 4 according to this embodiment supplies a first exciting current to a first exciting coil 3a. The first exciting current is obtained by phase-modulating a sine wave carrier having a first angular frequency $\omega 0$ by a modulated sine wave having a second angular frequency $\omega 2$. In this embodiment, b1=b, and $\theta 1=0$ in equation (3).

With this phase modulation, the phase of the first exciting current is given by $\omega 0 t - m_p \cos(\omega 2 t) + \pi$.

Of the magnetic field generated from the first exciting coil 3a when the first exciting current is supplied from the power supply section 4, a magnetic field component B1 which is perpendicular to both an electrode axis EAX and a measuring pipe axis PAX on the electrode axis EAX is given by $$B1 = b \cos\{\omega 0 t - m_p \cos(\omega 2 t) + \pi\} \quad (74)$$

The power supply section 4 also supplies a second exciting current to a second exciting coil 3b. The second exciting current is obtained by phase-modulating a sine wave carrier having the same angular frequency $\omega 0$ as that of the first exciting current and a predetermined phase difference $\theta 2$ by a modulated sine wave having the same angular frequency $\omega 2$ as that of the modulated wave component of the first exciting current and an opposite phase.

With this phase modulation, the phase of the second exciting current is given by $\omega 0 t - \{\theta 2 + m_p \cos(\omega 2 t)\}$.

In this embodiment, b2=b in equation (4). Of the magnetic field generated from the second exciting coil 3b when the second exciting current is supplied from the power supply section 4, a magnetic field component B2 which is perpendicular to both the electrode axis EAX and the measuring pipe axis PAX on the electrode axis EAX is given by equation (58).

The magnitude $|Epm|$ of a complex vector Epm, which is obtained in accordance with the same procedures as in the fourth embodiment, is given by $$|Epm|=2^{1/2}brk[J_1(m_p)^2\{v^{2+\omega02+\omega02}\cos(\theta 2)-v^2\cos(\theta 2)-2v\omega 0\sin(\theta 2)\}]^{1/2} \quad (75)$$

The magnitude $|Eor|$ of a complex vector $Eor$ is given by $$|Eor|=2^{1/2}brk[J_0(m_p)^2\{v^{2+\omega02-\omega02}\cos(\theta 2)-v^2\cos(\theta 2)+2v\omega 0\sin(\theta 2)\}]^{1/2} \quad (76)$$

The magnitude $|Epm|$ given by equation (75) and the magnitude $|Eor|$ given by equation (76) have no term containing an angle $\theta 00$.

The magnitudes $|Eor|$ and $|Epm|$ contain brk. However, when a ratio Rpm is obtained by equation (71), brk is erased from the ratio Rpm. Hence, when the flow rate is detected on the basis of the ratio Rpm, a flow rate measurement error due to the variation in delay of the magnetic field with respect to the exciting current or the shift of the amplitude of the magnetic field can be quickly and automatically canceled.

When equations (75) and (76) are substituted into equation (71), and equation (71) is solved about v, we obtain $$v = \omega 0[-\{J_0(m_p)^2\cos(\theta 2)\sin(\theta 2) + \quad (77)$$
$$J_1(m_p)^2\sin(\theta 2)\cos(\theta 2)Rpm^2 +$$
$$J_1(m_p)^2\sin(\theta 2)Rpm^2 + J_0(m_p)^2\sin(\theta 2)\} +$$
$$2\,|\,J_0(m_p)J_1(m_p)\{\cos(\theta 2)+1\}Rpm\,|]/$$
$$\{2J_0(m_p)^2\cos(\theta 2) + J_0(m_p)^2 +$$
$$J_0(m_p)^2\cos(\theta 2)^2 - J_1(m_p)^2Rpm^2 +$$
$$J_1(m_p)^2\cos(\theta 2)^2Rpm^2\}$$

From equation (24), equation (77) can be rewritten to $$V = \alpha \times \omega 0[-\{J_0(m_p)^2\cos(\theta 2)\sin(\theta 2) + \quad (78)$$
$$J_1(m_p)^2\sin(\theta 2)\cos(\theta 2)Rpm^2 +$$
$$J_1(m_p)^2\sin(\theta 2)Rpm^2 + J_0(m_p)^2\sin(\theta 2)\} +$$
$$2\,|\,J_0(m_p)J_1(m_p)\{\cos(\theta 2)+1\}Rpm\,|]/$$
$$\{2J_0(m_p)^2\cos(\theta 2) + J_0(m_p)^2 +$$
$$J_0(m_p)^2\cos(\theta 2)^2 - J_1(m_p)^2Rpm^2 +$$
$$J_1(m_p)^2\cos(\theta 2)^2Rpm^2\} \text{ for } \alpha = 1/\gamma$$

A signal conversion section 5 frequency-separates an interelectrode electromotive force Eac by using a filter, as in the first embodiment, to obtain the amplitude of the component having the angular frequency ($\omega 0+\omega 2$) or ($\omega 0-\omega 2$) (the magnitude $|Epm|$ of the complex vector Epm).

The signal conversion section 5 also obtains the amplitude of the component having the angular frequency $\omega 0$ (the magnitude $|Eor|$ of the complex vector Eor). The signal conversion section 5 calculates the ratio Rpm of the magnitudes $|Eor|$ to $|Epm|$.

A flow rate output section 6 calculates a flow velocity V of the fluid to be measured by using equation (78) on the basis of the ratio Rpm obtained by the signal conversion section 5. With the above arrangement, the same effect as in the first embodiment can be obtained.

[Sixth Embodiment]

The sixth embodiment of the present invention will be described next. The arrangement of an electromagnetic flowmeter according to this embodiment is the same as in the first embodiment and will be described with reference to FIG. 4. A power supply section 4 according to this embodiment supplies a first sine wave exciting current having a first angular frequency $\omega 0$ to a first exciting coil 3a.

In this embodiment, b1=b, and $\theta 1=0$ in equation (3). Of the magnetic field generated from the first exciting coil 3a when the first exciting current is supplied from the power supply section 4, a magnetic field component B1 which is perpendicular to both an electrode axis EAX and a measuring pipe axis PAX on the electrode axis EAX is given by equation (27).

The power supply section 4 also supplies a second exciting current to a second exciting coil 3b. The second exciting current is obtained by frequency-modulating a sine wave carrier having the same angular frequency $\omega 0$ as that of the first exciting current and a predetermined phase difference $\theta 2$ by a modulated sine wave having a second angular frequency $\omega 2$.

With this phase modulation, the phase of the second exciting current is given by $\omega 0t-\{\theta 2+m_f\sin(\omega^2 t)\}$ where $m_f$ is a frequency modulation index which represents the frequency deviation amount at the maximum amplitude of the modulated wave.

In this embodiment, b2=b in equation (4). Of the magnetic field generated from the second exciting coil 3b when the second exciting current is supplied from the power supply section 4, a magnetic field component B2 which is perpendicular to both the electrode axis EAX and the measuring pipe axis PAX on the electrode axis EAX is given by $$B2=b\cos[\omega 0t-\{\theta 2+m_f\sin(\omega 2t)\}] \quad (79)$$

In equation (26), b1=b2=b, $\theta 1=0$, and $\theta 01=\theta 00$. When the magnetic fields B1 and B2 are given by equations (27) and (79), we obtain $$Eac = Ec + Evc = b\omega 0rk\exp\{j(\pi/2+\theta 00)\} + \quad (80)$$
$$b(\omega 0rk\exp[j(-\pi/2+m_f\sin(\omega 2t) +$$
$$\theta 2+\theta 00)] + brkv\exp\{j(\theta 00)\} +$$
$$brkv\exp[j\{m_f\sin(\omega 2t)+\theta 2+\theta 00\}$$

The vector as the second term on the right-hand side of equation (80), i.e., $b\omega 0rk\exp[j\{-\pi/2+m_f\sin(\omega 2t)+\theta 2+\theta 00\}]$ can be rewritten to $b\omega 0rk\cos\{\omega 0t-m_f\sin(\omega 2t)-(-\pi/2+\theta 2+\theta 00)\}$ as time expression. This time expression can also be rewritten to $$b\omega 0rk\cos\{\omega 0t-m_f\sin(\omega 2t)-(-\pi/2+\theta 2+\theta 00)\} = \quad (81)$$
$$b\omega 0rk[\cos\{\omega 0t-(-\pi/2+\theta 2+\theta 00)\}\cos\{m_f\sin(\omega 2t)\} +$$
$$\sin\{\omega 0t-(-\pi/2+\theta 2+\theta 00)\}\sin$$
$$\{m_f\sin(\omega 2t)\}]$$

In equation (81), $\cos\{m_f\sin(\omega 2t)\}$ and $\sin\{m_f\sin(\omega 2t)\}$ can be rewritten to $$\cos\{m_f\sin(\omega 2t)\} = J_0(m_f) + 2\sum_{n=2,4,\ldots}^{\infty}(-1)^{n/2}J_n(m_f)\sin(n\omega 2t) \quad (82)$$

$$\sin\{m_f\sin(\omega 2t)\} = 2\sum_{n=1,3,\ldots}^{\infty}(-1)^{(n-1)/2}J_n(m_f)\sin(n\omega 2t) \quad (83)$$

In equations (82) and (83), the Bessel function of fractional order, $j_n(m_f)$ (n=0, 1, 2, . . . ) is given by $$J_n(m_f) = \sum_{k=0}^{\infty} \frac{(-1)^k}{k!(n+k)!}\left(\frac{m_f}{2}\right)^{n+2k} \quad (84)$$

When only a case wherein n=0 or 1 is applied to equations (82) and (83), equation (81) can be rewritten to $$b\omega 0 rk\cos\{\omega 0t - m_f\sin(\omega 2t) - (-\pi/2) + \theta 2 + \theta 00)\} = \quad (85)$$

$$b\omega 0 rk\ [\cos\{\omega 0t - (-\pi/2) + \theta 2 + \theta 00)\}J_0(m_f) +$$

$$\sin\{\omega 0t - (-\pi/2) + \theta 2 + \theta 00)\}2J_1(m_f)\sin(\omega 2t)] =$$

$$b\omega 0 rk\ [J_0(m_f)\cos\{\omega 0t - (-\pi/2) + \theta 2 + \theta 00)\} -$$

$$J_0(m_f)\cos\{(\omega 0 + \omega 2)t - (-\pi/2) + \theta 2 + \theta 00)\} +$$

$$J_1(m_f)\cos\{(\omega 0 - \omega 2)t - (-\pi/2) + \theta 2 + \theta 00)\}]$$

As is apparent from equation (85), the second term on the right-hand side of equation (80) forms a vector $b\omega 0rkJ_0(m_f)$ exp $\{j(-\pi/2+\theta 2+\theta 00)\}$ on a complex plane based on the angular frequency $\omega 0$, a vector $b\omega 0rk\{-j_1(m_f)\}\exp\{j(-\pi/2+\theta 2+\theta 00)\}$ on a complex plane based on the angular frequency ($\omega 0+\omega 2$), and a vector $b\omega 0rkj_1(m_f)\exp\{j(-\pi/2+\theta 2+\theta 00)\}$ on a complex plane based on the angular frequency ($\omega 0-\omega 2$).

The vector as the fourth term on the right-hand side of equation (80), i.e., brkv exp $[j\{m_f\sin(\omega 2t)+\theta 2+\theta 00\}]$ can be rewritten to brkv cos $\{\omega 0t-m_f\sin(\omega 2t)-(\theta 2+\theta 00)\}$ as time expression. This time expression can also be rewritten to $$brkv\cos\{\omega 0t - m_f\sin(\omega 2t) - (\theta 2 + \theta 00)\} = \quad (86)$$

$$brkv[\cos\{\omega 0t - (\theta 2 + \theta 00)\}\cos\{m_f\sin(\omega 2t)\} +$$

$$\sin\{\omega 0t - (\theta 2 + \theta 00)\}\sin\{m_f\sin(\omega 2t)\}]$$

Like the second term on the right-hand side of equation (80), when the Bessel function of fractional order $J_n(m_f)$ is applied, equation (86) can be rewritten to $$brkv\cos\{\omega 0t - m_f\sin(\omega 2t) - (\theta 2 + \theta 00)\} = \quad (87)$$

$$brkv[\cos\{\omega 0t - (\theta 2 + \theta 00)\}J_0 m_f +$$

$$\sin\{\omega 0t - (\theta 2 + \theta 00)\}2J_1(m_f)\sin(\omega 2t)] =$$

$$brkv[J_0(m_f)\cos\{(\omega 0t - (\theta 2 + \theta 00)\} -$$

$$J_1(m_f)\cos\{(\omega 0 + \omega 2)t - (\theta 2 + \theta 00)\} +$$

$$J_1(m_f)\cos\{(\omega 0 - \omega 2)t - (\theta 2 + \theta 00)\}]$$

As is apparent from equation (87), the fourth term on the right-hand side of equation (80) forms a vector $brkvJ_0(m_f)$ exp $\{j(\theta 2+\theta 00)\}$ on the complex plane based on the angular frequency $\omega 0$, a vector $brkv\{-j(m_f)\}\exp\{j(\theta 2+\theta 00)\}$ on the complex plane based on the angular frequency ($\omega 0+\omega 2$), and a vector $brkvj_1(m_f)\exp\{j(\theta 2+\theta 00)\}$ on the complex plane based on the angular frequency ($\omega 0-\omega 2$).

As is apparent from the above description, the second and fourth terms on the right-hand side of equation (80) form complex vectors having the same magnitude and reverse directions on the complex plane based on the angular frequency ($\omega 0+\omega 2$) and the complex plane based on the angular frequency ($\omega 0-\omega 2$).

A complex vector Efm formed on the complex plane based on the angular frequency ($\omega 0-\omega 2$) is given by $$Efm = b\omega 0rkJ_1(m_f)\exp\{j(-\pi/2+\theta 2+\theta 00)\} + brkvJ_1(m_f)\exp\{j(\theta 2+\theta 00)\} \quad (88)$$

In addition, the first to fourth terms on the right-hand side of equation (80) form a complex vector Eor on the complex plane based on the angular frequency $\omega 0$. The complex vector Eor is given by $$Eor = b\omega 0rk\exp\{j(\pi/2 + \theta 00)\} + brk\exp\{j(\theta 00)\} + \quad (89)$$

$$b\omega 0rkJ_0(m_f)\exp\{j(-\pi/2 + \theta 2 + \theta 00)\} +$$

$$brkvJ_0(m_f)\exp\{j(\theta_2 + \theta_{00})\}$$

A ratio Rfm of the magnitude |Eor| of the complex vector Eor to the magnitude |Efm| of the complex vector Efm is given by $$Rfm = |Eor|/|Efm| \quad (90)$$

When the magnitude |Eor| of the complex vector Eor obtained from equation (89) and the magnitude |Efm| of the complex vector Efm obtained from equation (88) are substituted into equation (90), and equation (90) is solved about v, we obtain $$v = [\omega 0\{-2J_0(m_f)\sin(\theta_2) + \quad (91)$$

$$\{2J_0(m_f)^2 - J_0(m_f)^4 + 2J_0(m_f)^2J_1(m_f)^2Rfm^2 - 1 +$$

$$2J_1(m_f)^2Rfm^2 - J_1(m_f)^4Rfm^4\}^{1/2}\}]/$$

$$\{J_0(m_f)^2 + 1 + 2J_0(m_f)\cos(\theta_2) - J_1(m_f)^2Rfm^2\}$$

Equation (91) has no term containing an angle $\theta 00$ or the amplitude (the amplitude of the carrier component of the magnetic field B2) b of the magnetic field B1. Hence, when the flow rate is detected on the basis of the ratio Rfm, a flow rate measurement error due to the variation in delay of the magnetic field with respect to the exciting current or the shift of the amplitude of the magnetic field can be quickly and automatically canceled.

From equation (24), equation (91) can be rewritten to $$V = \alpha \times [\omega 0\{-2J_0(m_f)\sin(\theta_2) + \quad (92)$$

$$\{2J_0(m_f)^2 - J_0(m_f)^4 + 2J_0(m_f)^2J_1(m_f)^2Rfm^2 - 1 +$$

$$2J_1(m_f)^2Rfm^2 - J_1(m_f)^4Rfm^4\}^{1/2}\}]/$$

$$\{J_0(m_f)^2 + 1 + 2J_0(m_f)\cos(\theta 2) - J_1(m_f)^2Rfm^2\}$$

for $\alpha = 1/\gamma$

A signal conversion section 5 frequency-separates an interelectrode electromotive force Eac by using a filter, as in the first embodiment, to obtain the amplitude of the component having the angular frequency ($\omega 0-\omega 2$) (the magnitude |Efm| of the complex vector Efm). The signal conversion section 5 also obtains the amplitude of the component having the angular frequency $\omega 0$ (the magnitude |Eor| of the complex vector Eor). The signal conversion section 5 calculates the ratio Rfm of the magnitudes |Eor| to |Efm|.

A flow rate output section 6 calculates a flow velocity V of the fluid to be measured by using equation (92) on the basis of the ratio Rfm obtained by the signal conversion section 5. With the above arrangement, the same effect as in the first embodiment can be obtained.

[Seventh Embodiment]

The seventh embodiment of the present invention will be described next. The arrangement of an electromagnetic flowmeter according to this embodiment is the same as in the first embodiment and will be described with reference to FIG. 4.

A power supply section 4 according to this embodiment supplies a first exciting current to a first exciting coil 3a. The first exciting current is obtained by frequency-modulating a sine wave carrier having a first angular frequency $\omega 0$ by a modulated sine wave having a second angular frequency $\omega 2$. In this embodiment, b1=b, and $\theta 1=0$ in equation (3).

With this frequency modulation, the phase of the first exciting current is given by $\omega 0 t - m_f \sin(\omega 2 t + \pi)$.

Of the magnetic field generated from the first exciting coil 3a when the first exciting current is supplied from the power supply section 4, a magnetic field component B1 which is perpendicular to both an electrode axis EAX and a measuring pipe axis PAX on the electrode axis EAX is given by $$B1 = b \cos\{\omega 0 t - m_f \sin(\omega 2 t + \pi)\} \tag{93}$$

The power supply section 4 also supplies a second exciting current to a second exciting coil 3b. The second exciting current is obtained by frequency-modulating a sine wave carrier having the same angular frequency $\omega 0$ as that of the first exciting current and a predetermined phase difference $\theta 2$ by a modulated sine wave having the same angular frequency $\omega 2$ as that of the modulated wave component of the first exciting current and an opposite phase.

With this frequency modulation, the phase of the second exciting current is given by $\omega 0 t - \theta 2 + m_f \sin(\omega 2 t)$.

In this embodiment, b2=b in equation (4). Of the magnetic field generated from the second exciting coil 3b when the second exciting current is supplied from the power supply section 4, a magnetic field component B2 which is perpendicular to both the electrode axis EAX and the measuring pipe axis PAX on the electrode axis EAX is given by equation (79).

The magnitude |Eor| of a complex vector Eor and the magnitude |Efm| of a complex vector Efm are obtained in accordance with the same procedures as in the sixth embodiment. When the magnitudes |Eor| and |Efm| are substituted into equation (90), and equation (90) is solved about v, we obtain $$v = \omega 0[-\{J_0(m_f)^2\cos(\theta 2)\sin(\theta 2) + \tag{94}$$
$$J_1(m_f)^2\sin(\theta 2)\cos(\theta 2)Rfm^2 +$$
$$J_1(m_f)^2\sin(\theta 2)Rfm^2 + J_0(m_f)^2\sin(\theta 2)\} +$$
$$2|J_0(m_f)J_1(m_f)\{\cos(\theta 2) + 1\}Rfm|]/$$
$$\{2J_0(m_f)^2\cos(\theta 2) + J_0(m_f)^2 +$$
$$J_0(m_f)^2\cos(\theta 2)^2 - J_1(m_f)^2 Rfm^2 +$$
$$J_1(m_f)^2\cos(\theta 2)^2 Rfm^2\}$$

Equation (94) has no term containing an angle $\theta 00$ or an amplitude b of the carrier components of the magnetic fields B1 and B2. Hence, when the flow rate is detected on the basis of a ratio Rfm, a flow rate measurement error due to the variation in delay of the magnetic field with respect to the exciting current or the shift of the amplitude of the magnetic field can be quickly and automatically canceled.

From equation (24), equation (94) can be rewritten to $$V = \alpha \times \omega 0[-\{J_0(m_f)^2\cos(\theta 2)\sin(\theta 2) + \tag{95}$$
$$J_1(m_f)^2\sin(\theta 2)\cos(\theta 2)Rfm^2 +$$
$$J_1(m_f)^2\sin(\theta 2)Rfm^2 + J_0(m_f)^2\sin(\theta 2)\} +$$
$$2|J_0(m_f)J_1(m_f)\{\cos(\theta 2) + 1\}Rfm|]/$$
$$\{2J_0(m_f)^2\cos(\theta 2) + J_0(m_f)^2 +$$
$$J_0(m_f)^2\cos(\theta 2)^2 - J_1(m_f)^2 Rfm^2 +$$
$$J_1(m_f)^2\cos(\theta 2)^2 Rfm^2\}$$

for $\alpha = 1/\gamma$

A signal conversion section 5 frequency-separates an interelectrode electromotive force Eac by using a filter, as in the first embodiment, to obtain the amplitude of the component having the angular frequency ($\omega 0 - \omega 2$) (the magnitude |Efm| of the complex vector Efm). The signal conversion section 5 also obtains the amplitude of the component having the angular frequency $\omega 0$ (the magnitude |Eor| of the complex vector Eor). The signal conversion section 5 calculates the ratio Rfm of the magnitudes |Eor| to |Efm|.

A flow rate output section 6 calculates a flow velocity V of the fluid to be measured by using equation (95) on the basis of the ratio Rfm obtained by the signal conversion section 5. With the above arrangement, the same effect as in the first embodiment can be obtained.

In the fourth to seventh embodiments, only a case wherein n=0 or 1 is applied in expanding the Bessel function of fractional order. Instead, the amplitude ratio Rpm or Rfm is obtained by separating a component having a sum frequency ($\omega 0 + \xi\omega 2$) or a difference frequency ($\omega 0 - \xi\omega 2$) of the first angular frequency $\omega 0$ and a third angular frequency (an angular frequency $\xi$-times higher than the second angular frequency $\omega 2$) $\xi\omega 2$ from the interelectrode electromotive force Eac. The flow velocity V of the fluid to be measured is calculated from the amplitude ratio Rpm or Rfm. In this case, even when $\xi$ is an integer of 2 or more, the flow velocity V can be calculated, as in the fourth to seventh embodiments, by applying a case wherein n=2 or more in expanding the Bessel function of fractional order.

In the first to seventh embodiments, in-phase component noise can be removed. Hence, the rectangular wave exciting method need not be used. Since the sine wave exciting method which uses a sine wave for an exciting current can be used, high-frequency excitation can be executed. When high-frequency excitation is used, 1/f noise can be removed, and the response to a change in flow rate can be increased.

The magnetic fields B1 and B2 applied to the fluid to be measured only need to satisfy the conditions described in each embodiment. Hence, the exciting coils may be arranged symmetrically by setting them such that the offset distance d1 from the plane PLN to the axis of the first exciting coil 3a is equal to the offset distance d2 for the plane PLN to the axis of the second exciting coil 3b. Alternatively, the exciting coils may be arranged asymmetrically by setting different offset distances d1 and d2.

Figure 8:
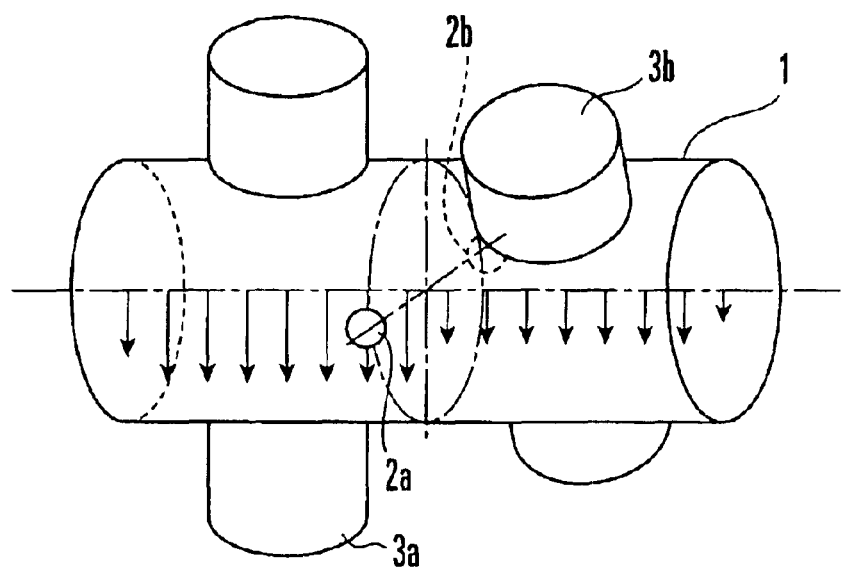
FIG. 8 is a view showing another example of the exciting coil arrangement in the electromagnetic flowmeter according to the present invention.

The angle made by the electrode axis EAX and the axis of the first exciting coil 3a may be equal to the angle made by the electrode axis EAX and the axis of the second exciting coil 3b (e.g., 90°). Alternatively, as shown in FIG. 8, the angle made by the electrode axis EAX and the axis of the first exciting coil 3a may be different from the angle made by the electrode axis EAX and the axis of the second exciting coil 3b. In the first to seventh embodiments, the phase difference $\theta 2$ may be 0.

Figure 9:
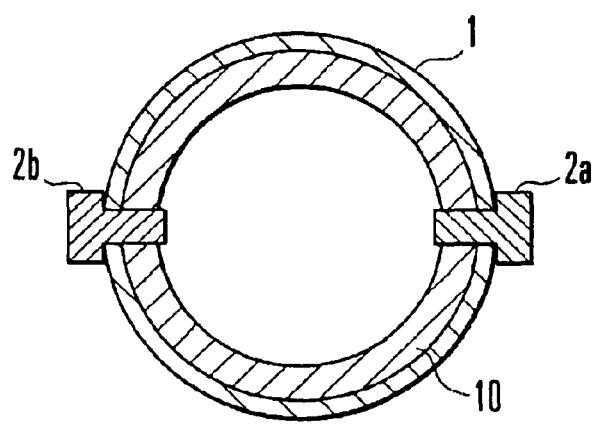
FIG. 9 is a sectional view showing an example of the electrode used in the electromagnetic flowmeter according to the present invention.
Figure 10:
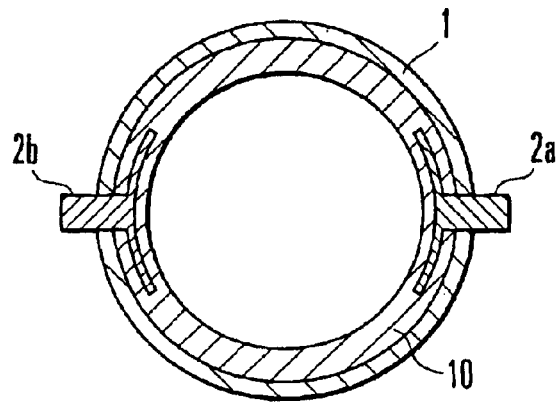
FIG. 10 is a sectional view showing another example of the electrode used in the electromagnetic flowmeter according to the present invention.
Figure 11:
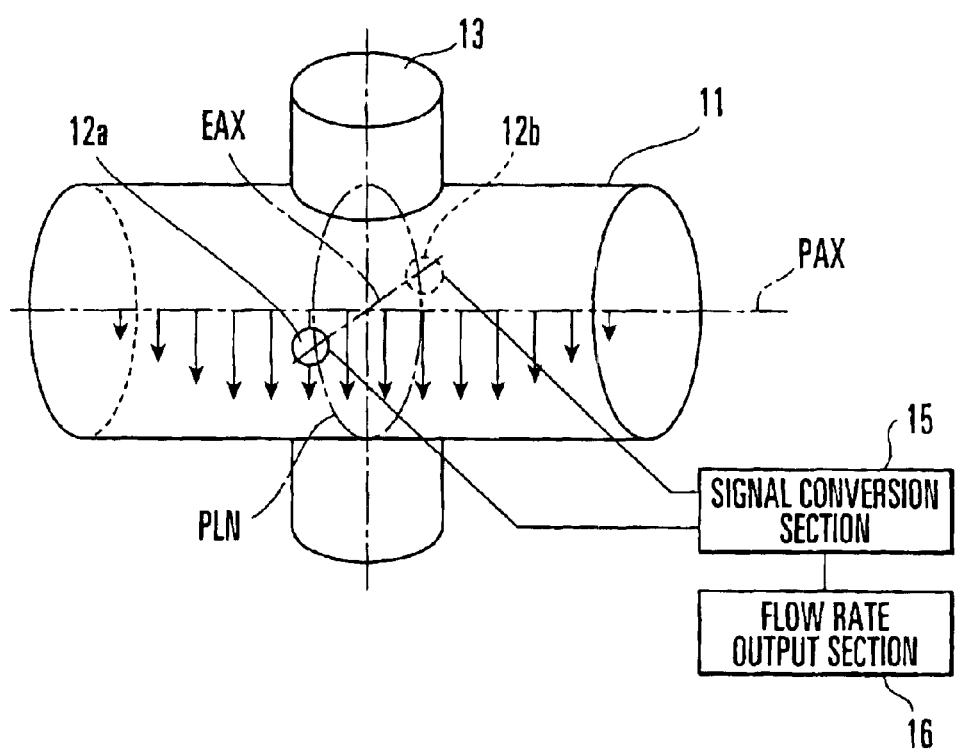
FIG. 11 is a block diagram showing the arrangement of a conventional electromagnetic flowmeter.

As the electrodes 2a and 2b used in the first to seventh embodiments, electrodes which are exposed from the inner wall of the measuring pipe 1 and come into contact with the fluid to be measured may be used, as shown in FIG. 9. Alternatively, as shown in FIG. 10, capacitively coupled electrodes which do not come into contact with the fluid to be measured may be used. When capacitively coupled electrodes are used, the electrodes 2a and 2b are covered with a lining 10 made of ceramic or Teflon (registered trademark) and formed on the inner wall of the measuring pipe 1.

In the first to seventh embodiments, the two electrodes 2a and 2b are used. However, the present invention is not limited to this. The present invention can also be applied to an electromagnetic flowmeter having only one electrode. When only one electrode is used, a ground ring is provided in the measuring pipe 1 to set the potential of the fluid to be measured to the ground potential. An electromotive force (the potential difference from the ground potential) generated in the single electrode is detected by the signal conversion section 5. When the two electrodes 2a and 2b are used, the electrode axis EAX forms a straight line that connects the electrodes 2a and 2b. When only one electrode is used, it is assumed that a virtual electrode is arranged on the plane PLN including the single real electrode at a position opposite to the real electrode with respect to the measuring pipe axis PAX. The straight line that connects the real electrode and the virtual electrode at this time corresponds to the electrode axis EAX.

The means for calculating the ratio Ram in the signal conversion section 5 and the flow rate output section 6 in the first embodiment, the means for obtaining the phase differences For and Cam in the signal conversion section 5 and the flow rate output section 6 in the second embodiment, the means for calculating the ratio Ram in the signal conversion section 5 and the flow rate output section 6 in the third embodiment, the means for calculating the ratio Rpm in the signal conversion section 5 and the flow rate output section 6 in the fourth and fifth embodiments, and the means for calculating the ratio Rfm in the signal conversion section 5 and the flow rate output section 6 in the sixth and seventh embodiments can be implemented by, e.g., a computer.

According to the present invention, a first magnetic field having a first frequency is applied to a fluid while a second magnetic field obtained by amplitude-, phase-, or frequency-modulating a carrier having the first frequency by a modulated wave having a second frequency is simultaneously applied to the fluid. Alternatively, a first magnetic field obtained by amplitude-, phase-, or frequency-modulating a carrier having a first frequency by a modulated wave having a second frequency is applied to a fluid while a second magnetic field obtained by amplitude-, phase-, or frequency-modulating a carrier having the first frequency by a modulated wave having the same frequency as that of the modulated wave of the first magnetic field and an opposite phase is simultaneously applied to the fluid.

Accordingly, a plurality of frequency components, i.e., the first frequency and the sum and difference frequencies of the first frequency and a third frequency (a frequency as an integer multiple of the second frequency) are generated in the interelectrode electromotive force. From two of the plurality of frequency components, an asymmetrical exciting characteristic parameter (amplitude ratio or phase difference) can be obtained, which depends on the flow rate of the fluid and does not depend on the variation in delay of the magnetic field with respect to the exciting current or the shift of the amplitude of the magnetic field.

When this asymmetrical exciting characteristic parameter is used, a flow rate can be calculated while quickly and automatically canceling a flow rate measurement error due to the variation in delay of the magnetic field with respect to the exciting current or the shift of the amplitude of the magnetic field.

In addition, since in-phase component noise can be removed, the rectangular wave exciting method need not be used. Since the sine wave exciting method can be used, high-frequency excitation can be executed. As a result, the flow rate can be accurately measured.

What is claimed is:

1. An electromagnetic flowmeter comprising:
   a measuring pipe through which a fluid to be measured flows;
   an electrode which is arranged in said measuring pipe and detects an electromotive force generated by a magnetic field applied to the fluid and flow of the fluid;
   a first exciting coil which is arranged separately from a plane, which includes said electrode and is perpendicular to a direction of an axis of said measuring pipe, and applies a first magnetic field having a first frequency to the fluid;
   a second exciting coil which is arranged on a side opposite to said first exciting coil with respect to the plane and applies, to the fluid, a second magnetic field obtained by amplitude-modulating a carrier having the first frequency by a modulated wave having a second frequency;
   a power supply section which supplies an exciting current to said first exciting coil and said second exciting coil;
   a signal conversion section which separates a component of the first frequency from the electromotive force detected by said electrode to obtain an amplitude, separates one of components of sum and difference frequencies of the first and second frequencies from the electromotive force to obtain an amplitude, and obtains a ratio of the amplitudes; and
   a flow rate output section which calculates a flow rate of the fluid on the basis of the amplitude ratio obtained by said signal conversion section.

2. A flowmeter according to claim 1, wherein
   on the basis of the amplitude ratio Ram obtained by said signal conversion section, a phase difference $\theta 2$ between the carrier components of the first and second magnetic fields, and an amplitude modulation index $m_a$ of the second magnetic field, said flow rate output section calculates the flow rate of the fluid by $\alpha \times \omega 0 \{-8 \sin(\theta 2) + Ramm_a(16 - Ram^2 m_a^2)^{1/2}\} / \{8 + 8\cos(\theta 2) - Ram^2 m_a^2\}$ ($\alpha$ is a coefficient).

3. An electromagnetic flowmeter comprising:
   a measuring pipe through which a fluid to be measured flows;
   an electrode which is arranged in said measuring pipe and detects an electromotive force generated by a magnetic field applied to the fluid and flow of the fluid;
   a first exciting coil which is arranged separately from a plane, which includes said electrode and is perpendicular to a direction of an axis of said measuring pipe, and applies a first magnetic field having a first frequency to the fluid;
   a second exciting coil which is arranged on a side opposite to said first exciting coil with respect to the plane and applies, to the fluid, a second magnetic field obtained by amplitude-modulating a carrier having the first frequency by a modulated wave having a second frequency;
   a power supply section which supplies an exciting current to said first exciting coil and said second exciting coil;
   a signal conversion section which separates a component of the first frequency from the electromotive force detected by said electrode to obtain a first phase difference between the first exciting current supplied to said first exciting coil and the component of the first frequency separated from the electromotive force, and separates one of components of sum and difference frequencies of the first and second frequencies from the second exciting current supplied to said second exciting coil and separates one of the components of the sum and difference frequencies from the electromotive force to obtain a second phase difference for the same frequency between the component separated from the second exciting current and the component separated from the electromotive force; and a flow rate output section which calculates a flow rate of the fluid on the basis of the first phase difference and the second phase difference obtained by said signal conversion section.

4. A flowmeter according to claim 3, wherein
on the basis of the first phase difference φ or and the second phase difference φam, which are obtained by said signal conversion section, the first frequency $\omega 0$, and a phase difference θ2 between the carrier components of the first and second magnetic fields, said flow rate output section calculates the flow rate of the fluid by $\alpha \times \omega 0 \tan(\pi/2+\phi am-\phi \text{ or } -\theta 2/2)$ (α is a coefficient).

5. An electromagnetic flowmeter comprising:
a measuring pipe through which a fluid to be measured flows;
an electrode which is arranged in said measuring pipe and detects an electromotive force generated by a magnetic field applied to the fluid and flow of the fluid;
a first exciting coil which is arranged separately from a plane, which includes said electrode and is perpendicular to a direction of an axis of said measuring pipe, and applies, to the fluid, a first magnetic field obtained by amplitude-modulating a carrier having a first frequency by a modulated wave having a second frequency;
a second exciting coil which is arranged on a side opposite to said first exciting coil with respect to the plane and applies, to the fluid, a second magnetic field obtained by amplitude-modulating the carrier having the first frequency by a modulated wave having the same frequency as that of the modulated wave and an opposite phase;
a power supply section which supplies an exciting current to said first exciting coil and said second exciting coil;
a signal conversion section which separates a component of the first frequency from the electromotive force detected by said electrode to obtain an amplitude, separates one of components of sum and difference frequencies of the first and second frequencies from the electromotive force to obtain an amplitude, and obtains a ratio of the amplitudes; and
a flow rate output section which calculates a flow rate of the fluid on the basis of the amplitude ratio obtained by said signal conversion section.

6. A flowmeter according to claim 5, wherein
on the basis of the amplitude ratio Ram obtained by said signal conversion section, a phase difference θ2 between the carrier components of the first and second magnetic fields, and an amplitude modulation index $m_a$ of the first and second magnetic fields, said flow rate output section calculates the flow rate of the fluid by $\alpha \times \omega 0 \{Ramm_a \cos(\theta 2/2)-2 \sin(\theta 2/2)\}/\{Ramm_a \sin(\theta 2/2)+2 \cos(\theta 2/2)\}$ (α is a coefficient).

7. An electromagnetic flowmeter comprising:
a measuring pipe through which a fluid to be measured flows;
an electrode which is arranged in said measuring pipe and detects an electromotive force generated by a magnetic field applied to the fluid and flow of the fluid;
a first exciting coil which is arranged separately from a plane, which includes said electrode and is perpendicular to a direction of an axis of said measuring pipe, and applies a first magnetic field having a first frequency to the fluid;
a second exciting coil which is arranged on a side opposite to said first exciting coil with respect to the plane and applies, to the fluid, a second magnetic field obtained by phase-modulating a carrier having the first frequency by a modulated wave having a second frequency;
a power supply section which supplies an exciting current to said first exciting coil and said second exciting coil;
a signal conversion section which, when a frequency corresponding to an integer multiple of the second frequency is defined as a third frequency, separates a component of the first frequency from the electromotive force detected by said electrode to obtain an amplitude, separates one of components of sum and difference frequencies of the first and third frequencies from the electromotive force to obtain an amplitude, and obtains a ratio of the amplitudes; and
a flow rate output section which calculates a flow rate of the fluid on the basis of the amplitude ratio obtained by said signal conversion section.

8. A flowmeter according to claim 7, wherein
on the basis of the amplitude ratio Rpm obtained by said signal conversion section, the first frequency $\omega 0$, a phase difference θ2 between the carrier components of the first and second magnetic fields, a phase modulation index $m_p$ of the second magnetic field, and a Bessel function of fractional order $j_n(m_p)$ (n=0 or 1), said flow rate output section calculates the flow rate of the fluid by $\alpha \times [\omega 0\{-2J_0(m_p)\sin(\theta 2)+\{2J_0(m_p)^2-J_0(m_p)^4+2J_0(m_p)^2J_1(m_p)^2Rpm^2-1+2J_1(m_p)^2Rpm^2-J_1(m_p)^4Rpm^4\}^{1/2}\}]/\{J_0(m_p)^2+1+2J_0(m_p)\cos(\theta 2)-J_1(m_p)^2Rpm^2\}$ (α is a coefficient).

9. An electromagnetic flowmeter comprising:
a measuring pipe through which a fluid to be measured flows;
an electrode which is arranged in said measuring pipe and detects an electromotive force generated by a magnetic field applied to the fluid and flow of the fluid;
a first exciting coil which is arranged separately from a plane, which includes said electrode and is perpendicular to a direction of an axis of said measuring pipe, and applies, to the fluid, a first magnetic field obtained by phase-modulating a carrier having a first frequency by a modulated wave having a second frequency;
a second exciting coil which is arranged on a side opposite to said first exciting coil with respect to the plane and applies, to the fluid, a second magnetic field obtained by phase-modulating the carrier having the first frequency by a modulated wave having the same frequency as that of the modulated wave and an opposite phase;
a power supply section which supplies an exciting current to said first exciting coil and said second exciting coil;
a signal conversion section which, when a frequency corresponding to an integer multiple of the second frequency is defined as a third frequency, separates a component of the first frequency from the electromotive force detected by said electrode to obtain an amplitude, separates one of components of sum and difference frequencies of the first and third frequencies from the electromotive force to obtain an amplitude, and obtains a ratio of the amplitudes; and
a flow rate output section which calculates a flow rate of the fluid on the basis of the amplitude ratio obtained by said signal conversion section.

10. A flowmeter according to claim 9, wherein
on the basis of the amplitude ratio Rpm obtained by said signal conversion section, the first frequency $\omega 0$, a phase difference $\theta 2$ between the carrier components of the first and second magnetic fields, a phase modulation index $m_p$ of the first and second magnetic fields, and a Bessel function of fractional order $j_n(m_p)$ (n=0 or 1), said flow rate output section calculates the flow rate of the fluid by $\alpha \times \omega 0[-\{J_0(m_p)^2 \cos(\theta 2)\sin(\theta 2)+J_1(m_p)^2 \sin(\theta 2)\cos(\theta 2)Rpm^2+J_1(m_p)^2 \sin(\theta 2)Rpm^2+J_0(m_p)^2 \sin(\theta 2)\}+2|J_0(m_p)J_1(m_p)\{\cos(\theta 2)+1\}Rpm|]/\{2J_0(m_p)^2 \cos(\theta 2)+J_0(m_p)^2+J_0(m_p)^2 \cos(\theta 2)^2-J_1(m_p)^2 Rpm^2+J_1(m_p)^2 \cos(\theta 2)^2 Rpm^2\}$ ($\alpha$ is a coefficient).

11. An electromagnetic flowmeter comprising:

a measuring pipe through which a fluid to be measured flows;

an electrode which is arranged in said measuring pipe and detects an electromotive force generated by a magnetic field applied to the fluid and flow of the fluid;

a first exciting coil which is arranged separately from a plane, which includes said electrode and is perpendicular to a direction of an axis of said measuring pipe, and applies a first magnetic field having a first frequency to the fluid;

a second exciting coil which is arranged on a side opposite to said first exciting coil with respect to the plane and applies, to the fluid, a second magnetic field obtained by frequency-modulating a carrier having the first frequency by a modulated wave having a second frequency;

a power supply section which supplies an exciting current to said first exciting coil and said second exciting coil;

a signal conversion section which, when a frequency corresponding to an integer multiple of the second frequency is defined as a third frequency, separates a component of the first frequency from the electromotive force detected by said electrode to obtain an amplitude, separates one of components of sum and difference frequencies of the first and third frequencies from the electromotive force to obtain an amplitude, and obtains a ratio of the amplitudes; and a flow rate output section which calculates a flow rate of the fluid on the basis of the amplitude ratio obtained by said signal conversion section.

12. A flowmeter according to claim 11, wherein on the basis of the amplitude ratio Rfm obtained by said signal conversion section, the first frequency $\omega 0$, a phase difference $\theta 2$ between the carrier components of the first and second magnetic fields, a frequency modulation index $m_f$ of the second magnetic field, and a Bessel function of fractional order $j_n(m_f)$ (n=0 or 1), said flow rate output section calculates the flow rate of the fluid by $\alpha \times [\omega 0\{-2J_0(m_f)\sin(\theta 2)+\{2J_0(m_f)^2-J_0(m_f)^4+2J_0(m_f)^2J_1(m_f)^2Rfm^2-1+2J_1(m_f)^2Rfm^2-J_1(m_f)^4Rfm^4\}^{1/2}\}]/\{J_0(m_f)^2+1+2J_0(m_f)\cos(\theta 2)-J_1(m_f)^2 Rfm^2\}$ ($\alpha$ is a coefficient).

13. An electromagnetic flowmeter comprising:

a measuring pipe through which a fluid to be measured flows;

an electrode which is arranged in said measuring pipe and detects an electromotive force generated by a magnetic field applied to the fluid and flow of the fluid;

a first exciting coil which is arranged separately from a plane, which includes said electrode and is perpendicular to a direction of an axis of said measuring pipe, and applies, to the fluid, a first magnetic field obtained by frequency-modulating a carrier having a first frequency by a modulated wave having a second frequency;

a second exciting coil which is arranged on a side opposite to said first exciting coil with respect to the plane and applies, to the fluid, a second magnetic field obtained by frequency-modulating the carrier having the first frequency by a modulated wave having the same frequency as that of the modulated wave and an opposite phase;

a power supply section which supplies an exciting current to said first exciting coil and said second exciting coil;

a signal conversion section which, when a frequency corresponding to an integer multiple of the second frequency is defined as a third frequency, separates a component of the first frequency from the electromotive force detected by said electrode to obtain an amplitude, separates one of components of sum and difference frequencies of the first and third frequencies from the electromotive force to obtain an amplitude, and obtains a ratio of the amplitudes; and a flow rate output section which calculates a flow rate of the fluid on the basis of the amplitude ratio obtained by said signal conversion section.

14. A flowmeter according to claim 13, wherein on the basis of the amplitude ratio Rfm obtained by said signal conversion section, the first frequency $\omega 0$, a phase difference $\theta 2$ between the carrier components of the first and second magnetic fields, a frequency modulation index $m_f$ of the first and second magnetic fields, and a Bessel function of fractional order $j_n(m_f)$ (n=0 or 1), said flow rate output section calculates the flow rate of the fluid by $\alpha \times \omega 0[-\{J_0(m_f)^2 \cos(\theta 2)\sin(\theta 2)+J_1(m_f)^2 \sin(\theta 2)\cos(\theta 2)Rfm^2+J_1(m_f)^2 \sin(\theta 2)Rfm^2+J_0(m_f)^2 \sin(\theta 2)\}+2|J_0(m_f)J_1(m_f)\{\cos(\theta 2)+1\}Rfm|]/\{2J_0(m_f)^2 \cos(\theta 2)+J_0(m_f)^2+J_0(m_f)^2 \cos(\theta 2)^2-J_1(m_f)^2Rfm^2+J_1(m_f)^2 \cos(\theta 2)^2 Rfm^2\}$ ($\alpha$ is a coefficient).

* * * * *